(12) United States Patent
Noguchi et al.

(10) Patent No.: US 7,480,223 B2
(45) Date of Patent: Jan. 20, 2009

(54) RECORDING AND READING METHOD AND DEVICE FOR DYE BASED WRITE-ONCE DVD MEDIUM

(75) Inventors: Soh Noguchi, Kawasaki (JP); Tsutomu Sato, Yokahama (JP); Tatsuya Tomura, Tokyo (JP); Yasunobu Ueno, Yokahama (JP)

(73) Assignee: Ricoh Company, Ltd. (JP)

( * ) Notice: Subject to any disclaimer, the term of this patent is extended or adjusted under 35 U.S.C. 154(b) by 735 days.

(21) Appl. No.: 11/044,470

(22) Filed: Jan. 28, 2005

(65) Prior Publication Data

US 2005/0169148 A1  Aug. 4, 2005

(30) Foreign Application Priority Data

| Jan. 30, 2004 | (JP) | 2004-023592 |
| Feb. 23, 2004 | (JP) | 2004-045873 |
| Feb. 23, 2004 | (JP) | 2004-045931 |
| Mar. 17, 2004 | (JP) | 2004-075935 |
| Mar. 17, 2004 | (JP) | 2004-075962 |
| Mar. 31, 2004 | (JP) | 2004-102062 |

(51) Int. Cl.
G11B 7/00 (2006.01)
(52) U.S. Cl. ................ 369/59.11; 369/59.12
(58) Field of Classification Search .......... 369/59.11, 369/59.12
See application file for complete search history.

(56) References Cited

U.S. PATENT DOCUMENTS

| 4,646,103 A | 2/1987 | Sugiyama et al. |
| 6,226,255 B1 * | 5/2001 | Suzuki et al. ............ 369/275.1 |
| 6,781,937 B2 * | 8/2004 | Nakajo .................... 369/59.12 |
| 6,894,965 B2 * | 5/2005 | Furumiya et al. ......... 369/59.12 |
| 7,139,230 B2 * | 11/2006 | Shirota et al. ........... 369/59.11 |
| 2001/0053115 A1 * | 12/2001 | Nobukuni et al. ........ 369/59.12 |
| 2002/0021642 A1 * | 2/2002 | Sasaki et al. ............ 369/59.11 |
| 2003/0142606 A1 * | 7/2003 | Ogawa et al. ............ 369/59.11 |
| 2005/0041548 A1 * | 2/2005 | Masui ..................... 369/47.53 |
| 2005/0147015 A1 * | 7/2005 | Seo ........................ 369/116 |
| 2005/0286390 A1 * | 12/2005 | Minemura et al. .......... 369/116 |
| 2008/0247293 A1 * | 10/2008 | Nakamura et al. ....... 369/59.23 |

FOREIGN PATENT DOCUMENTS

| JP | 2001-155339 | 6/2001 |
| JP | 2001-176073 | 6/2001 |
| JP | 2001-243626 | 9/2001 |
| JP | 2001-273636 | 10/2001 |
| JP | 2002-63721 | 2/2002 |
| JP | 2002-298415 | 10/2002 |
| JP | 2002-370451 | 12/2002 |

* cited by examiner

*Primary Examiner*—Wayne R Young
*Assistant Examiner*—Linh T Nguyen
(74) *Attorney, Agent, or Firm*—Dickstein Shapiro LLP

(57) ABSTRACT

A recording method of recording information in a dye-based write-once digital versatile disc (DVD) containing a substrate having a wobbled guide groove and a recording layer containing an organic dye. Recording is performed by irradiating the DVD with three kinds of single light pulses. Each single pulse contains a recording area to record a mark and a cooling area having a light quantity not greater than 0.1 mW for a predetermined time. When the mark having a shortest length is formed, the DVD is irradiated with a first single light pulse. When the mark having a second shortest length is formed, the DVD is irradiated with a second single light pulse. When the mark having a third shortest length or longer is formed, the DVD is irradiated with a third single light pulse.

32 Claims, 22 Drawing Sheets

RECORDING AND READING METHOD AND DEVICE FOR DYE BASED WRITE-ONCE DVD MEDIUM

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The present invention relates to a recording and reading method and device which can perform recording information by irradiating a recording layer in a dye based write-once DVD medium with a light beam to cause changes in optical characteristics such as transmittance and reflectivity, playing back the information and additional recording.

2. Discussion of the Background

Recently, an increase in recording speed of DVD (digital versatile disc) +R or –R serving as a large storage optical disc has been demanded. To perform high speed recording, it is necessary to use a recording laser beam having a high power and a recording material having a high sensitivity, and to optimize the recording method such as recording waveforms. To increase the storage capacity of a DVD+ or -, it is necessary to develop a recording material in which a recording pit of a small size can be recorded, to adopt an image compression technology such as MPEG2, to reduce the wavelength of the semiconductor laser used for reading recording pits, etc.

As a semiconductor laser having a wavelength in the red wavelength range, only an AlGaInP laser diode in 670 nm band has been commercialized for a bar code reader and a measuring instrument so far. However, a red laser beam begins to be marketed in the optical storage market as the density of an optical disc increases. DVD drives use a light source having a wavelength in a 630 to 690 nm band. On the other hand, a commercialized read-only DVD-ROM drives use a light source having a wavelength of about 650 nm.

In general, in the case of dye based write-once DVD media in which pits (i.e., marks) are formed upon application of heat thereto, the pulse width and the recording power of a recording pulse emitted from a light source at recording are optimized at a particular linear velocity. Therefore, when the recording linear velocity changes, the state of formed marks and spaces also changes. Specifically, a problem occurs in that heat applied by a front heating pulse for forming a mark is short in amount. Also another problem exists in that the average length of formed marks varies because the heating temperatures are different from the optimal decomposition temperature. In addition, a problem exists in that the duty ratio of optimal heating pulses varies, resulting in formation of marks with different widths (i.e., marks which are different in width depending on their length). As a result, the jitter characteristics of such dye based write-once DVD media deteriorate.

With regard to the physical formats of the DVD media, DVD-R media are regulated by the format referred to as land prepit in which part of the land portion is cut. In this format, when the land prepit signals (LPPb: i.e., signals from a recording medium which are regulated before recording) are less than 0.16, the prepit information such as prepit address is not properly played back. When the LPPb is greater than 0.32, LPP signals themselves behave like a noise in the data area, resulting in frequent occurrence of data errors. Therefore, it is necessary to control the cutting width such that LPPb ranges from 0.16 to 0.32 by finely adjusting the land cutting width by a stamper so as to be suitable for the recording material.

There are a great number of known optical recording media using a dye in their recording layer. For example, one of such optical recording media is disclosed in Japanese Patent Application No. 2002-370451. Specific examples thereof include an optical medium which uses a polymethine dye or a polymethine dye with a light stabilizing material as a recording material, an optical medium which includes a layer containing a tetraazaporphyrin (porphyradine) dye or a cyanine dye with an azo metal chelate dye (salt forming dye) and a reflective layer in its recording layer, an optical medium which uses a formazan (metal chelate) dye with another dye as a recording material and an optical medium which uses a dipyrromethene (metal chelate) dye with another dye as a recording material. In addition, there are also a great number of literatures concerning recording media containing a dye as a recording material in which recording is performed using a high frequency wobbled guide groove, and their recording methods. Further, there are a large number of documents concerning multiple pulse recordings using a dye as a recording material. Furthermore, published unexamined Japanese Patent Applications Nos. 2001-243626, 2002-063721, 2001-273636, 2002-298415, 2001-176073 and 2001-155339 and U.S. Pat. No. 4,646,103 have disclosed recording methods using a single light pulse for a square wave or a single mark. However, as far as the inventors of the present invention know, there is no literature other than the present invention concerning recording information in a dye based write-once DVD medium with a single light pulse and focusing on a recording waveform at the time of performing a high speed recording.

Because of these reasons, a need exists for a recording method and device in which information can be recorded in a write-once DVD medium at different high recording linear velocities using a single light waveform while avoiding jitter errors.

BRIEF SUMMARY OF THE INVENTION

Accordingly, an object of the present invention is to provide an optical recording and reading method and device to perform good recording for a dye based write-once DVD medium at different high linear velocities using suitable recording waveforms.

Another object of the present invention is to provide a format system for the dye based write-once DVD system which uses a semiconductor laser having a relatively short oscillation wavelength compared with that for CD media. In this format system, as in the LPP system, non-recording areas between data are not formed. Further, different from the LPP system, cross talk to a data portion can be restrained without fine adjustment of the cut width which is necessary for the LPP system when molding a stamper.

These objects and other objects of the present invention hereinafter will become more readily apparent and can be attained by a recording method of recording information in a dye-based write-once digital versatile disc (DVD) including a substrate having a wobbled guide groove and a recording layer located overlying the substrate and containing an organic dye. The recording method includes irradiating the DVD with three kinds of single light pulses and each of the single light pulses contains a recording area to record a mark and a cooling area having a light quantity not greater than 0.1 mW for a predetermined time while a space is formed between the adjacent marks. When the mark having the shortest length is formed, the irradiation is performed as follows: irradiating the DVD with the first single light pulse in which the entire recording area has a power level of W0 or the front end portion of the recording area has a power level of W0 and the rest portion of the pulse has a power level of W1. When the mark having the second shortest length is formed, the irradiation is performed as follows: irradiating the DVD with the second single light pulse in which the entire recording area has a power level of W1, at least the front end portion of the recording area has a power level of W0 and the rest portion thereof has a power level of W1, or at least the front end portion of the recording area has a power level of W1 and the rest portion thereof has a power level of W2. When the mark having the third shortest length or longer is formed, the irradiation is performed as follows: irradiating the DVD with the third single light pulse in which at least the rear end portion of the recording area has a power level of W0 and the rest portion thereof has a power level of W1, or at least the rear end portion of the recording area has a power level of W1 and the rest portion thereof has a power level of W2. Further, W0, W1 and W2 satisfy the following relationship: W0>W1>W2. In addition, the highest power level of the second single light pulse is not lower than the highest power level of the third light pulse.

It is preferred that, in the recording method mentioned above, the recording area of the second single light pulse has a power level of W0 for the front end portion thereof and a power level of W1 for the rest portion thereof, and the recording area of the third single light pulse has a power level of W0 for the front end portion and the rear end portion thereof, and a power level of W1 for the middle portion thereof.

It is still further preferred that, in the recording method mentioned above, the recording area of the second single light pulse has a power level of W0 for the second front end portion thereof and a power level of W1 for the rest portion thereof, and the recording area of the third single light pulse has a power level of W0 for the rear end portion thereof and a power level of W1 for the rest portion.

It is still further preferred that, in the recording method mentioned above, the recording area of the second single light pulse has a power level of W1 for the front end portion thereof and a power level of W2 for the rest portion thereof, and the recording area of the third single light pulse has a power level of W1 for the front end portion and the rear end portion thereof and a power level of W2 for the middle portion thereof.

It is still further preferred that, in the recording method mentioned above, the recording area of the second single light pulse has a power level of W1 for the front end portion thereof and a power level of W2 for the rest portion thereof, and the recording area of the third single light pulse has a power level of W1 for the rear end portion thereof and a power level of W2 for the rest portion thereof.

It is still further preferred that, in the recording method mentioned above, the recording area of the second single light pulse has a power level of W0 for the front end portion thereof and a power level of W1 for the rest portion thereof, and the recording area of the third single light pulse has a power level of W1 for the rear end portion and a front end portion thereof and a power level of W2 for a middle portion thereof.

It is still further preferred that, in the recording method mentioned above, the recording area of the second single light pulse has a power level of W0 for the front end portion thereof and a power level of W1 for the rest portion thereof, and the recording area of the third single light pulse has a power level of W1 for the rear end portion thereof and a power level of W2 for the rest portion thereof.

It is still further preferred that, in the recording method mentioned above, the recording area of the first single light pulse has a power level of W0 for the front end portion thereof and a power level of W1 for the rest portion thereof, the recording area of the second single light pulse has a power level of W1 for the entire portion thereof or for the front end portion and the rear end portion and a power level of W2 for the middle portion, and the recording area of the third single light pulse has a power level of W1 for the rear end portion and the front end portion thereof and a power level of W2 for the middle portion thereof.

It is still further preferred that, in the recording method mentioned above, the recording area of the first single light pulse has a power level of W0 for the front end portion thereof and a power level of W1 for the rest portion thereof, the recording area of the second single light pulse has a power level of W1 for the entire portion thereof or for the front end portion and the rear end portion thereof and a power level of W2 for the middle portion thereof, and the recording area of the third single light pulse has a power level of W1 for the rear end portion thereof and a power level of W2 for the rest portion thereof.

It is still further preferred that, in the recording method mentioned above, the length of a portion of the DVD which is irradiated with the cooling area of the single light pulse for the predetermined time is 1/6 to 6/6 of the length of a space having the shortest length.

It is still further preferred that, in the recording method mentioned above, when the mark having the shortest length is recorded after a space having the shortest length, a width of the front end portion of the recording area of the single light pulse for the mark is set to be longer than that of the front end portion of the recording area of the single light pulse for the mark having a length longer than the shortest length, and to be shorter than the width of the front end portion of the recording area of the single light pulse for the mark whose prior space has a length longer than the shortest length.

As another aspect of the present invention, a recording and reading method is provided in which information is recorded in a dye-based write-once digital versatile disc (DVD) including a substrate having a wobbled guide groove and a recording layer located overlying the substrate and containing an organic dye. Information is recorded by irradiating the DVD with three kinds of single light pulses. Each of the single light pulses includes a recording area to record a mark and a cooling area having a light quantity not greater than 0.1 mW for a predetermined time while a space is formed between the adjacent marks. Information is played back by irradiating the mark with light to reproduce information recorded in the DVD. When the mark having the shortest length is formed, the irradiation is performed as follows: irradiating the DVD with the first single light pulse in which the entire of the recording area has a power level of W0 or the front end portion of the recording area has a power level of W0 and the rest portion of the pulse has a power level of W1. When the mark having a second shortest length is formed, the irradiation is performed as follows: irradiating the DVD with the second single light pulse in which the entire of the recording area has a power level of W1; at least the front end portion of the recording area has a power level of W0 and the rest portion thereof has a power level of W1; or at least the front end portion of the recording area has a power level of W1 and the rest portion thereof has a power level of W2. When the mark having a third shortest length or longer is formed, the irradiation is performed as follows: irradiating the DVD with a third single light pulse in which at least a rear end portion of the recording area has a power level of W0 and the rest portion thereof has a power level of W1; or at least the rear end portion of the recording area has a power level of W1 and the rest portion thereof has a power level of W2. Further, W0, W1 and W2 satisfy the following relationship: W0>W1>W2. In addition, the highest power level of the second single light pulse is not lower than the highest power level of the third light pulse.

It is preferred that, in the recording and reading device mentioned above, the wobbled guide groove has a frequency of 4 T to 96 T and T represents a basic clock frequency.

It is still further preferred that, in the recording and reading device mentioned above, the ratio (Wo/PP) of the amplitude (Wo) of the wobbled guide groove to a push-pull amplitude (PP) of tracking error detection signals for detecting and controlling tracking errors determined with a two separation optical power detector is synchronized in a range of from 0.1 to 0.4.

It is still further preferred that, in the recording and reading method mentioned above, the single light pulse has a wavelength of from 600 to 720 nm.

It is still further preferred that, in the recording and reading method mentioned above, the recording layer has a refraction index n of from 1.5 to 3.0 and an extinction index k of 0.02 to 0.2 for light having a wavelength in the range of from −5 nm to +5 nm to the wavelength of the recording light and reading light.

It is still further preferred that, in the recording and reading method mentioned above, the decomposition starting temperature of the recording layer is from 100 to 360° C.

It is still further preferred that, in the recording and reading method mentioned above, the dye based write-once DVD medium further includes at least one of a reflective layer, a protective layer, an adhesive layer, a protective substrate and a hard coating layer on the substrate.

It is still further preferred that, in the recording and reading method mentioned above, the write-once DVD medium includes a reflective layer and the reflective layer includes one of a metal selected from the group consisting of Au, Ag, Al and alloys thereof.

It is still further preferred that, in the recording and reading method mentioned above, the dye-based write-once DVD medium includes a protective layer and the protective layer includes an ultraviolet curing resin.

It is still further preferred that, in the recording and reading method mentioned above, the dye-based write-once DVD medium includes the adhesive layer containing an adhesive agent containing an ultraviolet curing resin and further includes another substrate which is attached to the substrate with an adhesive layer therebetween to form a double sided recording medium.

As another aspect of the present invention, a recording and reading device is provided which includes a motor driver a spindle motor, and an optical pickup. The optical pickup is configured to irradiate a dye-based write-once digital versatile disc (DVD) containing a substrate having a wobbled guide groove and a recording layer located overlying the substrate which contains an organic dye with three kinds of single light pulses. Each of the single light pulses contains a recording area to record a mark and a cooling area having a light quantity not greater than 0.1 mW for a predetermined time while a space is formed between the adjacent marks. To reproduce information recorded in the DVD, the mark is irradiated with light. When the mark having a shortest length is formed, the DVD is irradiated with the first single light pulse in which the entire of the recording area has a power level of W0 or the front end portion of the recording area has a power level of W0 and the rest portion of the pulse has a power level of W1. When the mark having a second shortest length is formed, the DVD is irradiated with the second single light pulse in which the entire of the recording area has a power level of W1; at least the front end portion of the recording area has a power level of W0 and the rest portion thereof has a power level of W1; or at least the front end portion of the recording area has a power level of W1 and the rest portion thereof has a power level of W2. When the mark having the third shortest length or longer is formed, the DVD is irradiated with the third single light pulse in which at least the rear end portion of the recording area has a power level of W0 and the rest portion thereof has a power level of W1; or at least the rear end portion of the recording area has a power level of W1 and the rest portion thereof has a power level of W2. Further, W0, W1 and W2 satisfy the following relationship: W0>W1>W2. In addition, the highest power level of the second single light pulse is not lower than the highest power level of the third light pulse.

It is preferred that, in the recording and reading device mentioned above, the recording area of the second single light pulse has a power level of W0 for the front end portion thereof and a power level of W1 for the rest portion thereof, and the recording area of the third single light pulse has a power level of W0 for the front end portion and the rear end portion thereof, and a power level of W1 for the middle portion thereof.

It is still further preferred that, in the recording and reading device mentioned above, the recording area of the second single light pulse has a power level of W0 for the second front end portion thereof and a power level of W1 for the rest portion thereof, and the recording area of the third single light pulse has a power level of W0 for the rear end portion thereof and a power level of W1 for the rest portion.

It is still further preferred that, in the recording and reading device mentioned above, the recording area of the second single light pulse has a power level of W1 for the front end portion thereof and a power level of W2 for the rest portion thereof, and the recording area of the third single light pulse has a power level of W1 for the front end portion and the rear end portion thereof and a power level of W2 for the middle portion thereof.

It is still further preferred that, in the recording and reading device mentioned above, the recording area of the second single light pulse has a power level of W1 for the front end portion thereof and a power level of W2 for the rest portion thereof, and the recording area of the third single light pulse has a power level of W1 for the rear end portion thereof and a power level of W2 for the rest portion thereof.

It is still further preferred that, in the recording and reading device mentioned above, the recording area of the second single light pulse has a power level of W0 for the front end portion thereof and a power level of W1 for the rest portion thereof, and the recording area of the third single light pulse has a power level of W1 for the rear end portion and the front end portion thereof and a power level of W2 for the middle portion thereof.

It is still further preferred that, in the recording and reading device mentioned above, the recording area of the second single light pulse has a power level of W0 for the front end portion thereof and a power level of W1 for the rest portion thereof, and the recording area of the third single light pulse has a power level of W1 for the rear end portion thereof and a power level of W2 for the rest portion thereof.

It is still further preferred that, in the recording and reading device mentioned above, the recording area of the first single light pulse has a power level of W0 for the front end portion thereof and a power level of W1 for the rest portion thereof, the recording area of the second single light pulse has a power level of W1 for the entire portion thereof or for the front end portion and the rear end portion and a power level of W2 for the middle portion, and the recording area of the third single light pulse has a power level of W1 for the rear end portion and the front end portion thereof and a power level of W2 for the middle portion thereof.

It is still further preferred that, in the recording and reading device mentioned above, the recording area of the first single light pulse has a power level of W0 for the front end portion thereof and a power level of W1 for the rest portion thereof, the recording area of the second single light pulse has a power level of W1 for an entire portion thereof or for the front end portion and a rear end portion thereof and a power level of W2 for a middle portion thereof, and the recording area of the third single light pulse has a power level of W1 for the rear end portion thereof and a power level of W2 for the rest portion thereof.

It is still further preferred that, in the recording and reading device mentioned above, the length of a portion of the DVD which is irradiated with the cooling area of the single light pulse for the predetermined time is 1/6 to 6/6 of the length of a space having the shortest length.

It is still further preferred that, in the recording and reading device mentioned above, when the mark having the shortest length is recorded after a space having the shortest length, the width of the front end portion of the recording area of the single light pulse for the mark is set to be longer than that of the front end portion of the recording area of the single light pulse for the mark having a length longer than the shortest length, and to be shorter than the width of the front end portion of the recording area of the single light pulse for the mark whose prior space has a length longer than the shortest length.

These and other objects, features and advantages of the present invention will become apparent upon consideration of the following description of the preferred embodiments of the present invention taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION OF THE INVENTION

Figure 1A:
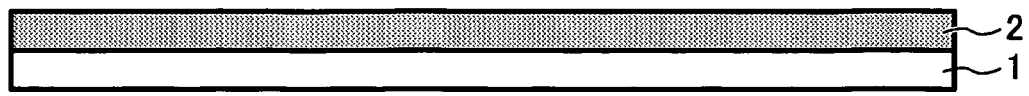
FIGS. 1A to 1D are diagrams illustrating examples of layer structures of a typical write-once optical recording device.
Figure 1B:
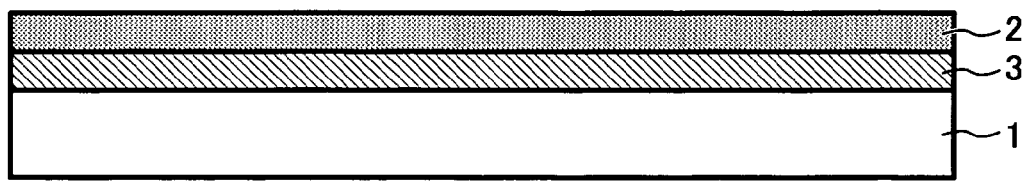
Figure 1C:
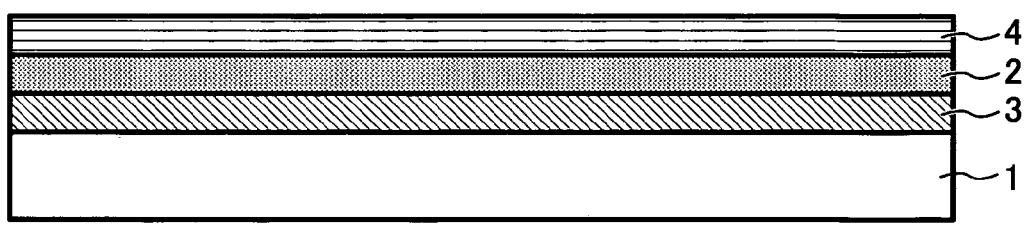
Figure 1D:

The present invention will be described below in detail with reference to several embodiments and accompanying drawings.

The present invention is a recording and reading method and device for a dye based write-once DVD medium. The DVD medium contains a recording layer mainly made of an organic dye which is formed on a substrate having a wobbled guiding groove thereon. The present invention specifies basic optimal pulse irradiation patterns to a write-once DVD medium. The power of irradiated light pulse for marks having the third shortest length or longer, i.e., marks having a length other than the shortest length and the second shortest length, is raised at its rear end portion and optionally its front end portion. In the present invention, improving the quality of recording at a high linear velocity is an important issue. This quality is greatly affected by how uniformly the mark having the shortest length is formed. In the present invention, the power of a pulse forming a mark having the shortest length is partially or entirely raised compared with those of other pulses forming a mark having any other length. In addition, the quality of the uniformity can be further improved by raising the power of a light pulse forming a mark having the second shortest length at its frond end portion to securely and uniformly form the front end portion thereof. When forming a mark having the third shortest length or longer, jitters can be improved by raising the power of the pulse at only its front end portion. However, this is little effective to improve the low asymmetry issue, which is one of the objectives of the present invention. Thus, it is good to raise the power for the mark having the third shortest length or longer at least at its rear end portion. Namely, the objectives of the present invention are achieved by raising the power of a light pulse forming a mark having the third shortest length or longer at least at its rear end portion and the power of a light pulse forming a mark having the shortest length entirely or at its front end portion and having a portion at which the power of a light pulse forming a mark having the second shortest length is relatively high compared with that of a light pulse forming a mark having the third shortest length or longer if necessary. In the case of a pulse power for a mark having the third shortest length or longer, jitters and asymmetry issue can be moderately improved by raising the power at its front end and rear end portions. The low asymmetry issue can be improved by raising the power at only its rear end portion. Even when raising the power at only its rear end portion, jitters can also be improved by finely controlling the parameters of a strategy.

When forming a mark having the third shortest length or longer, the length of a portion which is formed by a raised power is from 0.2 to 2.5 times the basic clock cycle T, meaning the range from 0.2 to 2.5 T, and preferably from 0.5 to 2.0 T. The length of the front end portion of a mark having the shortest length which is formed by a raised power and the length of the front end portion or the rear end portion of a mark having the second shortest length which is formed by a raised power are from 0.2 to 1 T and preferably from 0.2 T to 1.5 T.

The power of a light pulse irradiated to a mark has three levels, which are W0, W1 and W2. These three power levels satisfy the following relationships: W0>W1>W2. The marks are formed by a single light pulse having a power level selected from the group consisting of the three power levels or a combination thereof as follows. The marks having the shortest length are formed by the power level W0 or W0 and W1. The marks having the second shortest length are formed by the power level W0 and W1, W1, or W1 and W2. The marks having at least the third length are formed by the power level W0 and W1 or W1 and W2. The power levels used for each portion of marks are shown in Table 1.

TABLE 1

| | | |
|---|---|---|
| Mark having the shortest length | When the power level is entirely raised | W0 |
| | When the power level is raised for its front portion | W0 for the front end portion and W1 for the rest portion |
| Mark having the second shortest length | When the power level is entirely raised | W1 |
| | When the power level is raised for its front portion. | W0 for the front end portion and W1 for the rest portion; or W1 for the front end portion and W2 for the rest portion |
| Mark having the third shortest length or longer | When the power level is raised for its front end portion and rear end portion. | W1 for the front end portion and the rear end portion and W2 for the rest portion |
| | When the power level is raised for its rear end portion. | W0 for the rear end portion and W1 for the rest portion; or W1 for the rear end portion and W2 for the rest portion |
| | When the power level is raised for its front end portion and rear end portion. | W0 for the front end portion and the rear end portion and W1 for the rest portion; or W1 for the front end portion and the rear end portion and W2 for the rest portion |

In addition, the following relationships are satisfied: W0/W1 is from 1.01 to 2.00 and preferably from 1.02 to 1.50; and W1/W2 is from 1.05 to 3.00 and preferably from 1.08 to 2.00. These marks are irradiated with light to reproduce information.

In the present invention, preferred irradiation conditions for a cooling area provided after the recording area of each pulse are specified. The length of a portion of the DVD irradiated with the cooling area of the single light pulse for the predetermined time is 1/6 to 6/6 of the length of a space having the shortest length. When the time length is outside this range, it is difficult to obtain the effects of the present invention.

When a pulse having the waveform mentioned above is selected, recording performance is good with low jitters especially at a high linear velocity recording.

To record information in a dye based optical information recording medium at a high linear velocity, it is necessary to use a high recording power. As a result, thermal interference between the marks is easy to occur. On this point, the present invention is effective because uniform and sharp mark edges can be obtained.

When recording is performed using the conventional technology mentioned above, the power margin decreases because the range of the recording power by which the lowest jitter can be obtained is offset from the range of the recording power with which the errors occur most frequently. Specifically, the recording power by which the lowest jitter can be obtained at a high linear velocity recording tends to be minus on asymmetry so that errors are easy to occur no matter how low the jitter is. For example, a medium which can record data with minus on asymmetry, lower jitters and less errors tends to err over time due to changes in the medium and a drive used therefore when compared with a medium in which recording is performed with around zero asymmetry. The present invention provides a solution to this asymmetry problem.

When a mark is recorded by multiple light pulses, it is possible to solve the low asymmetry problem mentioned above by optimizing the light pulses. However, since multiple light pulses are used, recording quality may vary when the rise and fall time of the pulses vary. This variance is easy to occur as the recording linear velocity increases.

In contrast, the present invention adopts a system in which a mark is recorded by a single light pulse. Thereby, the recording quality obtained with this system does not vary as much as that obtained with the recording method using multiple light pulses mentioned above. Further, when detecting addresses while in writing information using the single light pulse method, it is easy to keep the quantity of light without much variance at recording because the single light pulse method is relatively simple compared with the multiple light pulse method. Furthermore, it is possible to obtain the quantity of reflection light without much variance not only from a space portion but also from a mark portion when detecting addresses. Therefore, the single light pulse method has an advantage in that address detection can be performed relatively easy even when each single light pulse contains a cooling area having a light quantity not greater than 0.1 mW.

Figure 4:
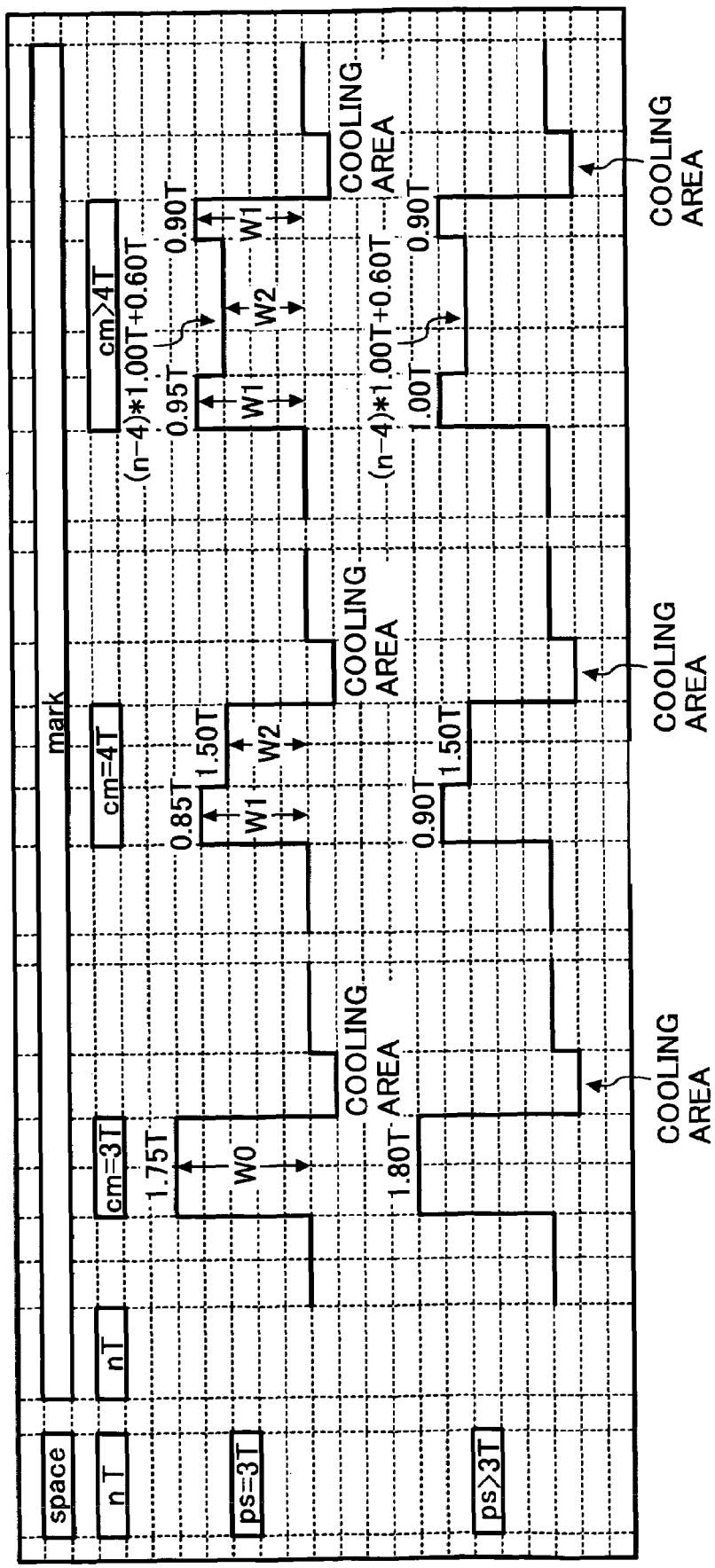
FIG. 4 is a diagram illustrating an example of the waveform of the light pulses of the present invention for a recording linear velocity of 56 m/s.
Figure 5:
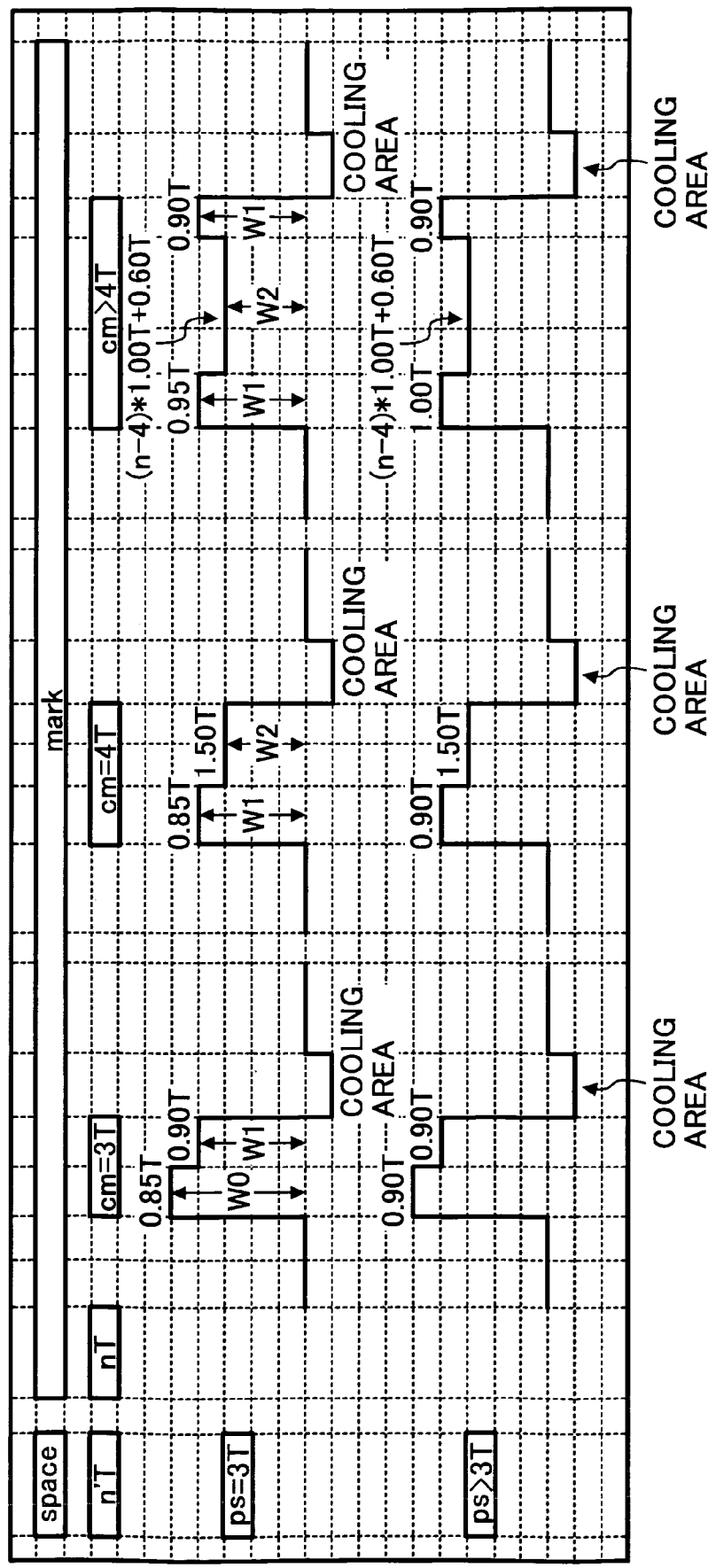
FIG. 5 is a diagram illustrating another example of the waveform of the light pulses of the present invention for a recording linear velocity of 56 m/s.

FIGS. 4 and 5 are waveform diagrams illustrating examples of the recording pulse waveforms which are formed by a single light pulse containing a recording area having a power level of W0 for the front end portion of a mark having the shortest length and a power level of W0 or W1 for the rest portion thereof, a single light pulse containing a recording area having a power level of W0 for the front end portion of a mark having the second shortest length and a power level of W1 for the rest portion thereof and a single light pulse containing a recording area having a power level of W0 for the front end portion and the rear end portion of a mark having the third shortest length or longer, and a power level of W1 for the rest portion thereof. In this case, the single light pulse has a recording area having a simple square waveform which is entirely raised or has a raised front end portion. The front end portion in the recording area in the single light pulse for a mark having the second shortest length and the front end portion and the rear end portion in the recording area in the single light pulse for a mark having the third shortest length or longer are raised to the same power level as that for the raised portion of the mark having the shortest length. The mark having the third shortest length or longer has two raised portions, i.e., its front and rear end portions. The two raised portions require a high power level so that it is easy to obtain good jitter results irrespective of the kind of optical information recording media when compared with waveforms illustrated in FIGS. 6 and 7 described below. However, there is a disadvantage in that it is not easy to expand this pattern to the commercialized drives.

Figure 6:
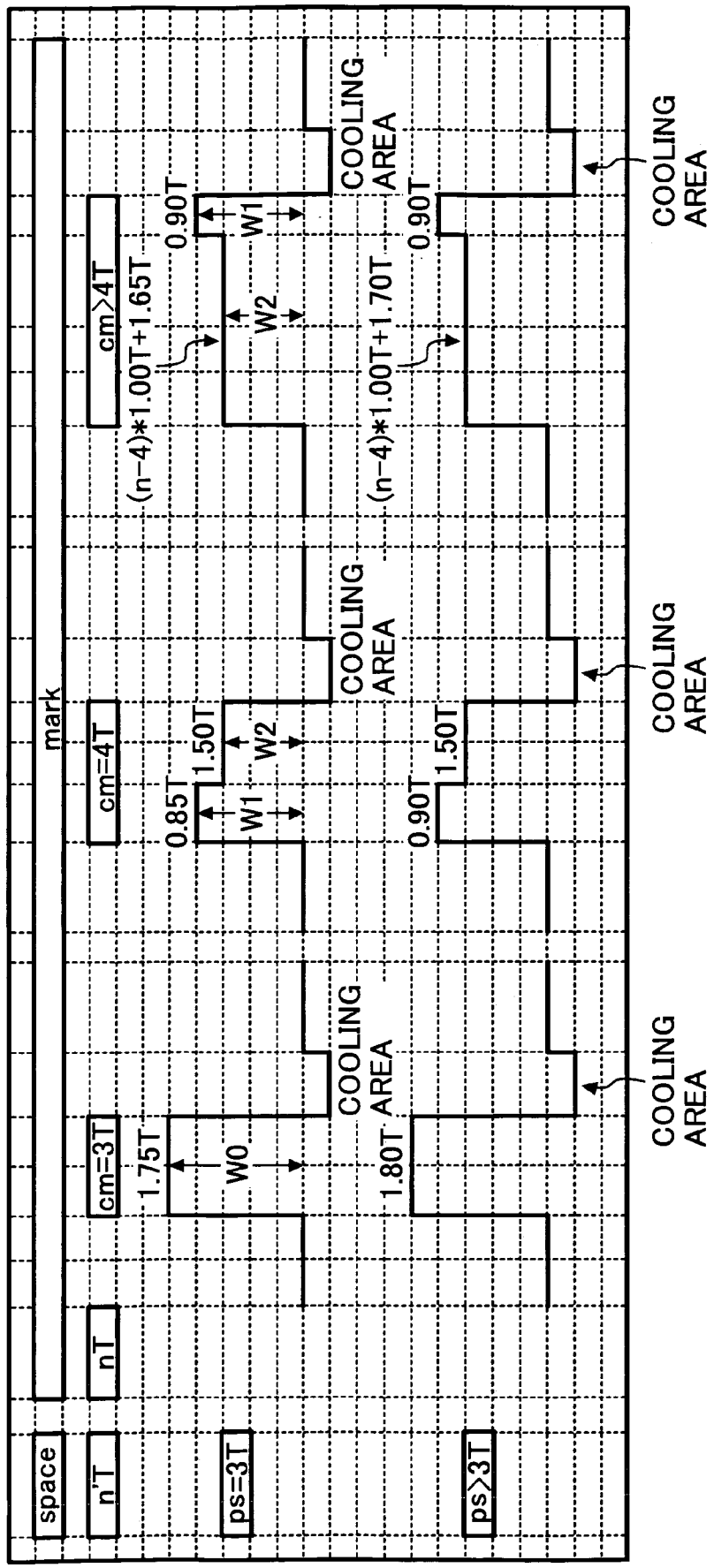
FIG. 6 is a diagram illustrating another example of the waveform of the light pulses of the present invention for a recording linear velocity of 56 m/s.
Figure 7:
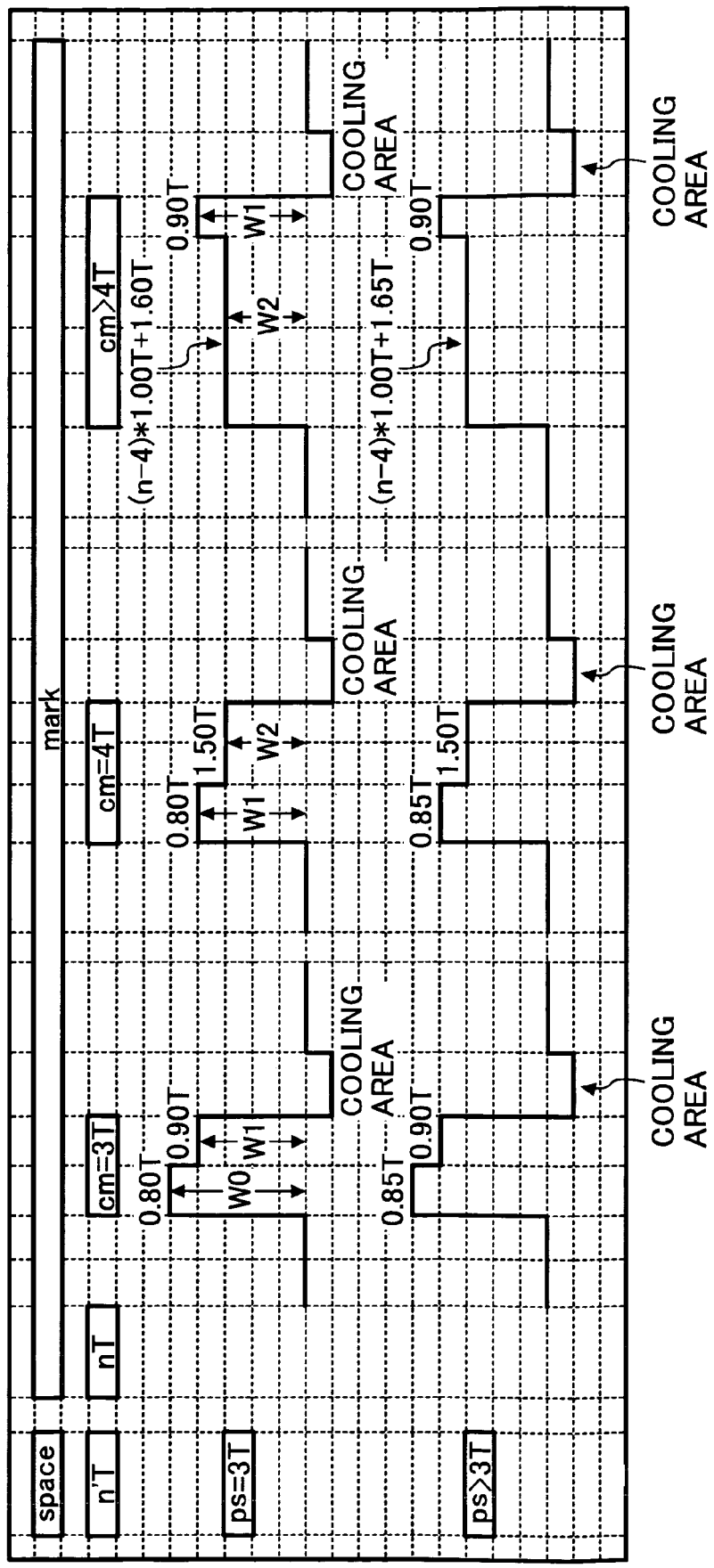
FIG. 7 is a diagram illustrating an example of the waveform of the light pulses of the present invention for a recording linear velocity of 42 m/s.

FIGS. 6 and 7 are waveform diagrams illustrating examples of the recording pulse waveforms which are formed by a single light pulse containing a recording area having a power level of W0 for the front end portion of a mark having the shortest length and a power level of W0 or W1 for the rest portion thereof, a single light pulse containing a recording area having a power level of W0 for the front end portion of a mark having the second shortest length and a power level of W1 for the rest portion thereof and a single light pulse containing a recording area having a power level of W0 for the rear end portion of a mark having the third shortest length or longer, and a power level of W1 for the rest portion thereof. The waveforms illustrated in FIGS. 6 and 7 are different from those illustrated in FIGS. 4 and 5 in that only the rear end portion of the mark having the third shortest length or longer is elevated. The pulse patterns illustrated in FIGS. 6 and 7 can be easily expanded among the commercialized drives because it is possible to select almost all the parameters in common among the commercialized drives except for raising the power level only for the rear end portion of each mark having the third shortest length or longer. However, the media are still required to obtain good jitter results even when the recording waveform patterns for use in optical recording media are simple.

Figure 8:
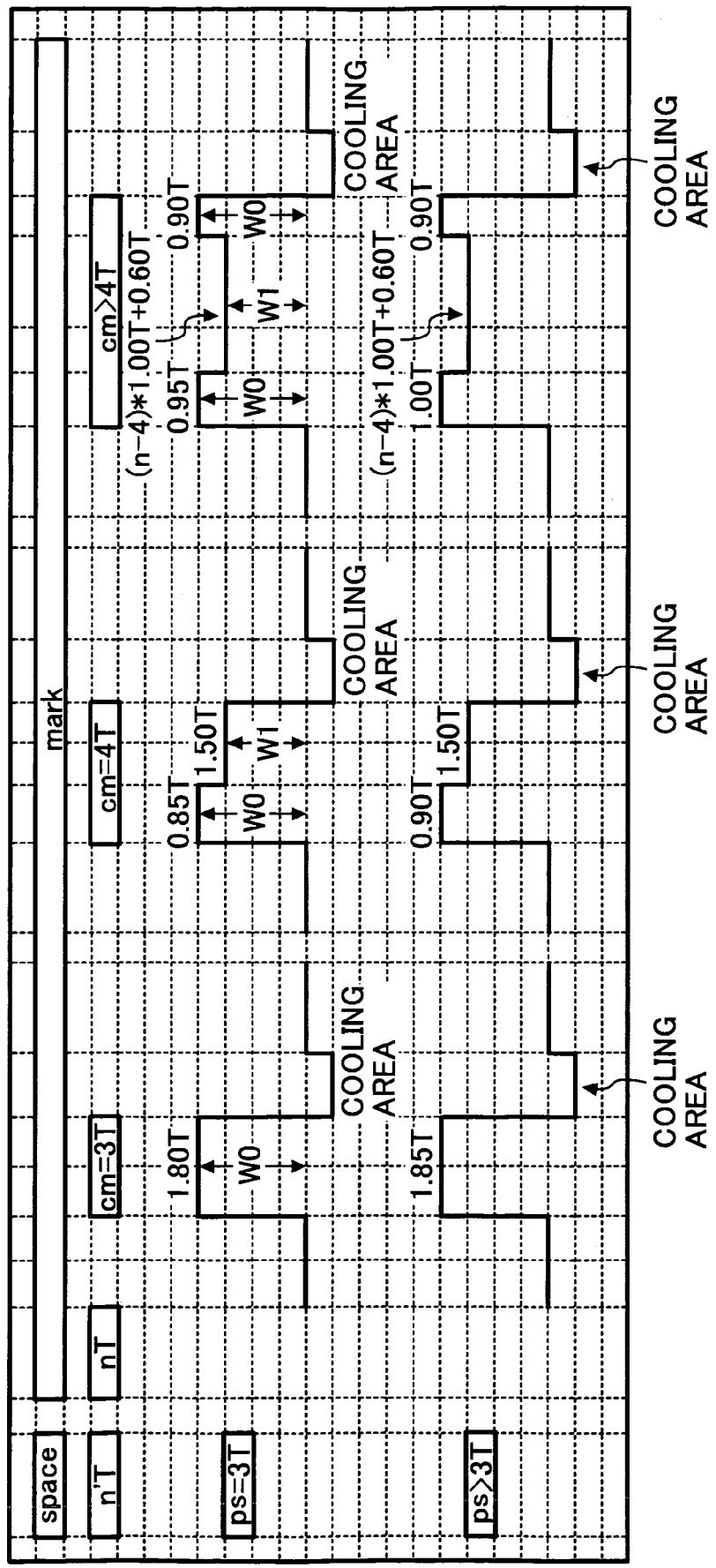
FIG. 8 is a diagram illustrating another example of the waveform of the light pulses of the present invention for a recording linear velocity of 56 m/s.
Figure 9:
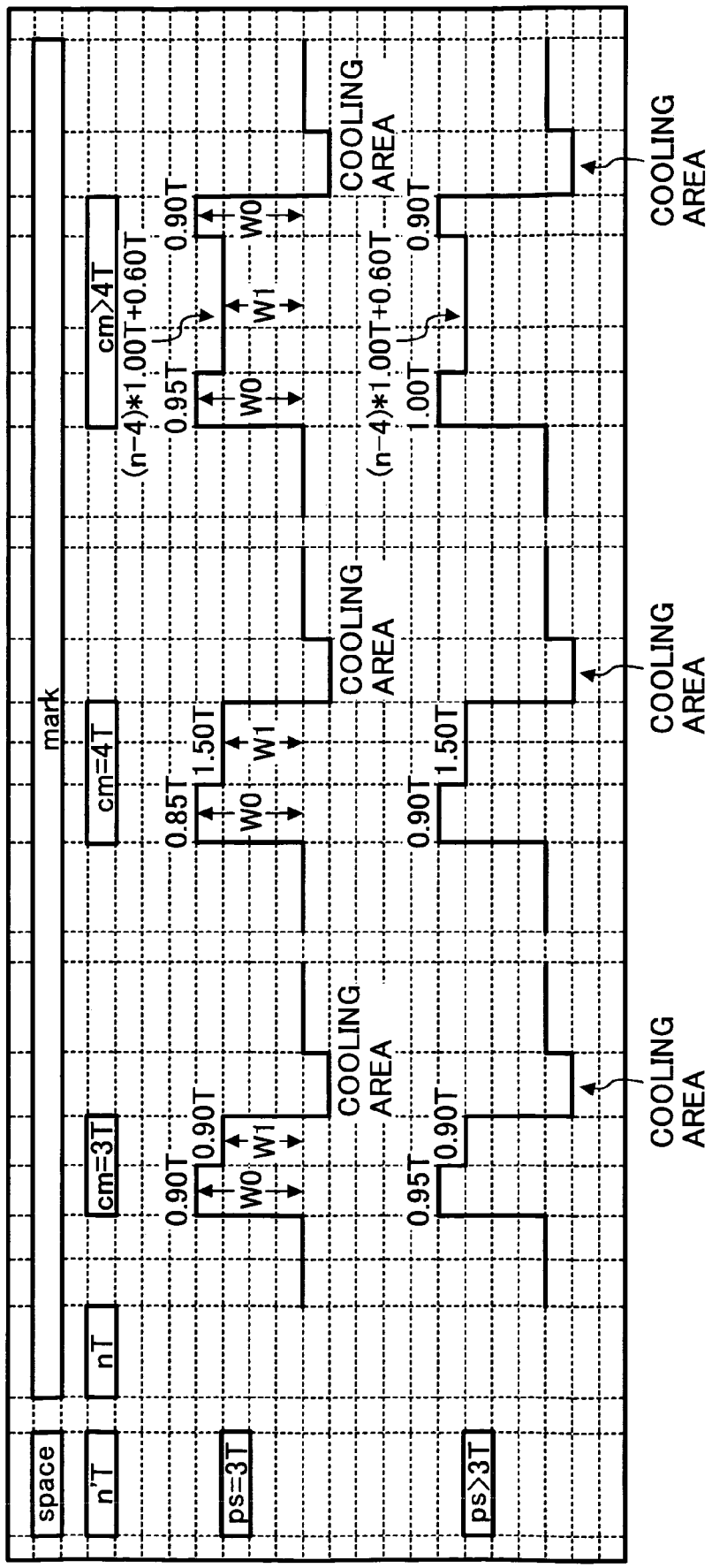
FIG. 9 is a diagram illustrating another example of the waveform of the light pulses of the present invention for a recording linear velocity of 56 m/s.

FIGS. 8 and 9 are waveform diagrams illustrating examples of the recording pulse waveforms which are formed by a single light pulse containing a recording area having a power level of W0 for the entire portion or the front end portion of a mark having the shortest length and a power level of W0 or W1 for the rest portion thereof, a single light pulse containing a recording area having a power level of W1 for the front end portion of a mark having the second shortest length and a power level of W2 for the rest portion thereof and a single light pulse containing a recording area having a power level of W1 for the front end portion and the rear end portion of a mark having the third shortest length or longer, and a power level of W2 for the rest portion thereof. In this case, the recording area in the single light pulse has a simple square waveform which is entirely raised or has a raised front end portion. The front end portion in the recording area in the single light pulse for the mark having the second shortest length and the front end portion and the rear end portion of the single light pulse for the mark having the third shortest length or longer are raised to the same power level as that for the not-raised portion of the mark having the shortest length when the front portion thereof is raised. Namely, these portions have the same power level which is lower than that for the mark having the shortest length when the recording area in the single light pulse therefore has the simple square waveform. The mark having the third shortest length or longer has two raised portions, i.e., its front and rear end portions. The two raised portions require a high power level so that it is easy to obtain good jitter results irrespective of the kind of optical information recording media when compared with waveforms illustrated in FIGS. 10 and 11 described below. However, there is a disadvantage in that it is not easy to expand this pattern to the commercialized drives.

Figure 10:
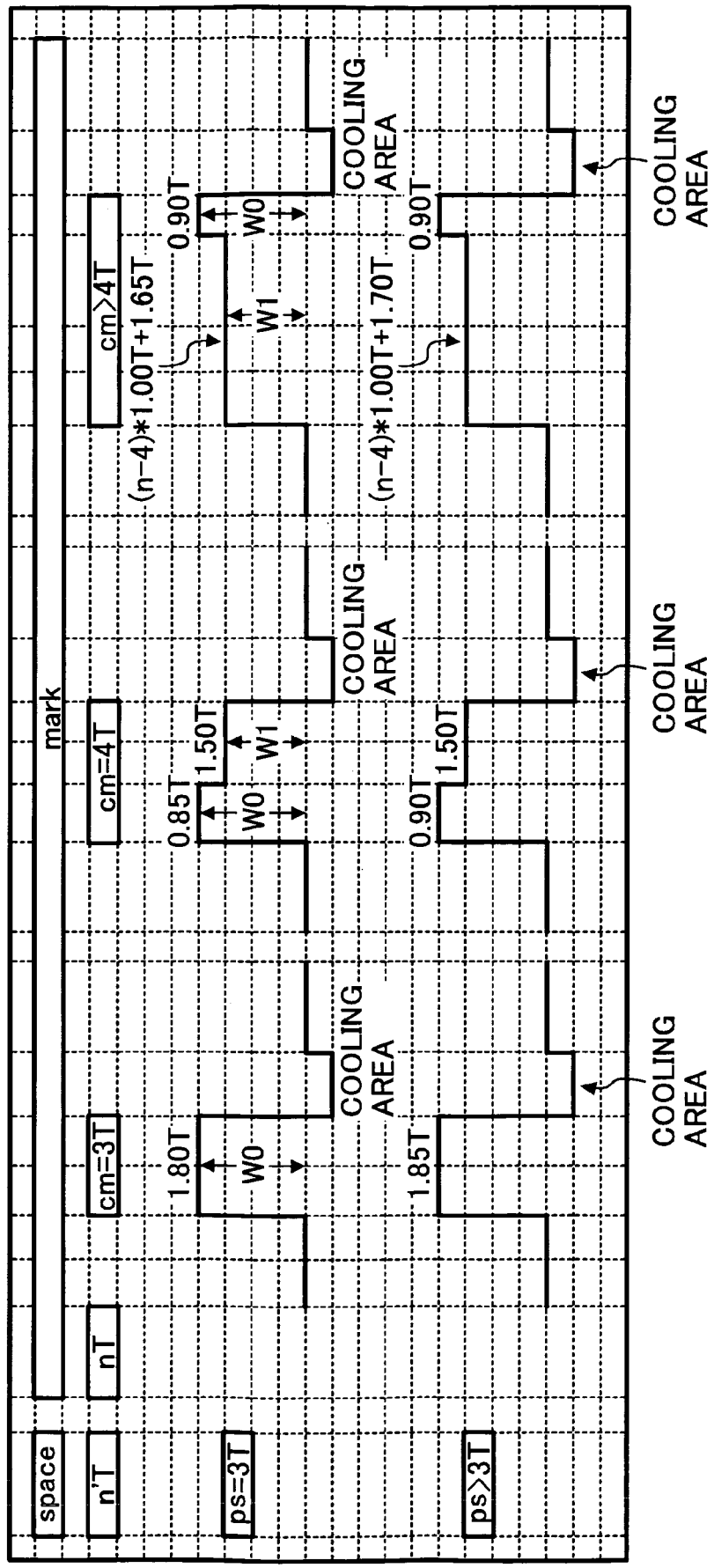
FIG. 10 is a diagram illustrating another example of the waveform of the light pulses of the present invention for a recording linear velocity of 56 m/s.
Figure 11:
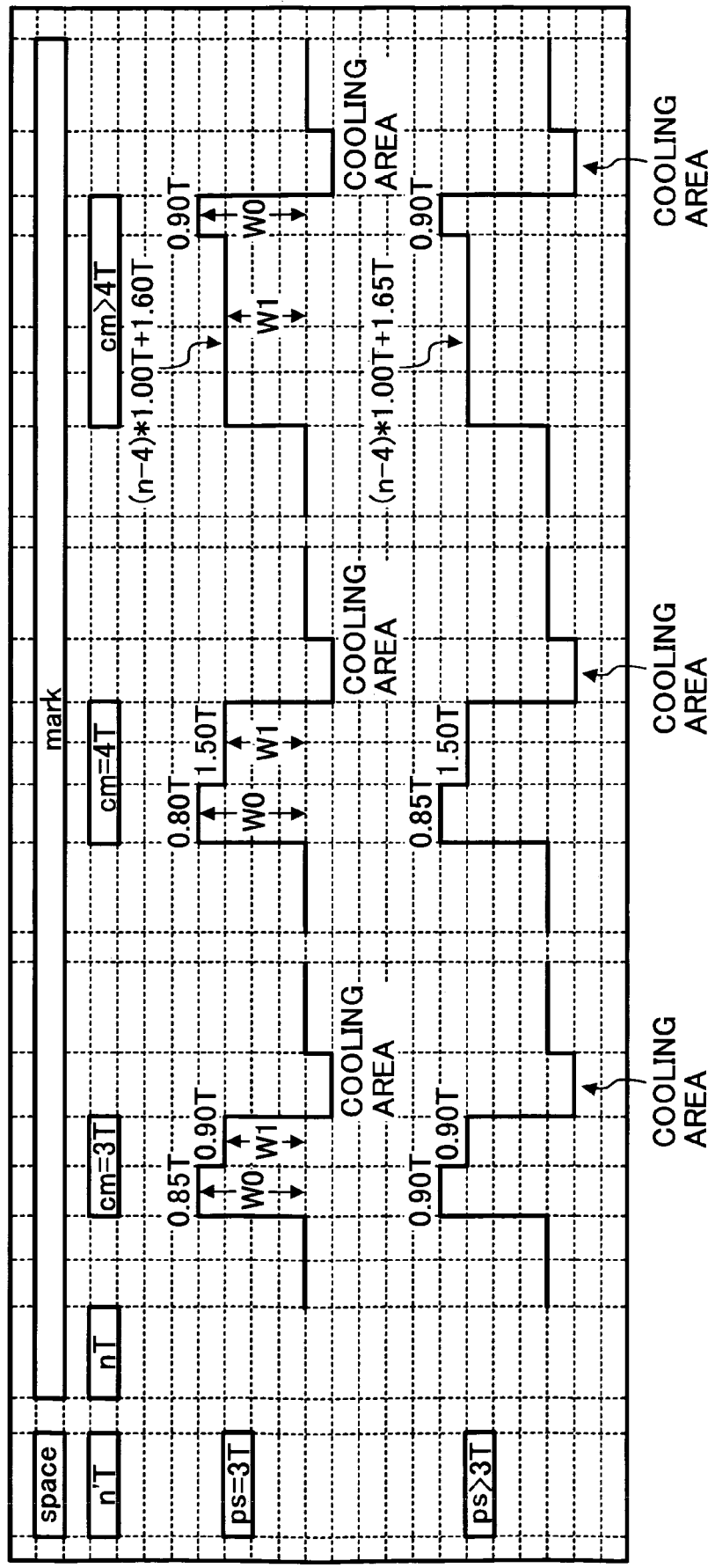
FIG. 11 is a diagram illustrating another example of the waveform of the light pulses of the present invention for a recording linear velocity of 42 m/s.

FIGS. 10 and 11 are waveform diagrams illustrating examples of the recording pulse waveforms which are formed by a single light pulse containing a recording area having a power level of W0 for the front end portion of a mark having the shortest length and a power level of W0 or W1 for the rest portion thereof, a single light pulse containing a recording area having a power level of W1 for the front end portion of a mark having the second shortest length and a power level of W2 for the rest portion thereof and a single light pulse containing a recording area having a power level of W1 for the rear end portion of a mark having the third shortest length or longer, and a power level of W2 for the rest portion thereof. The waveforms illustrated in FIGS. 10 and 11 are different from those illustrated in FIGS. 8 and 9 in that only the rear end portion of the mark having the third shortest length or longer is elevated. The pulse patterns illustrated in FIGS. 10 and 11 can be easily expanded among the commercialized drives because it is possible to select almost all the parameters in common among the drives except for raising the power level only for the rear end portion of each mark having the third shortest length or longer. However, the media are still required to obtain good jitter results even when the recording waveform patterns for use in optical recording media are simple.

Figure 12:
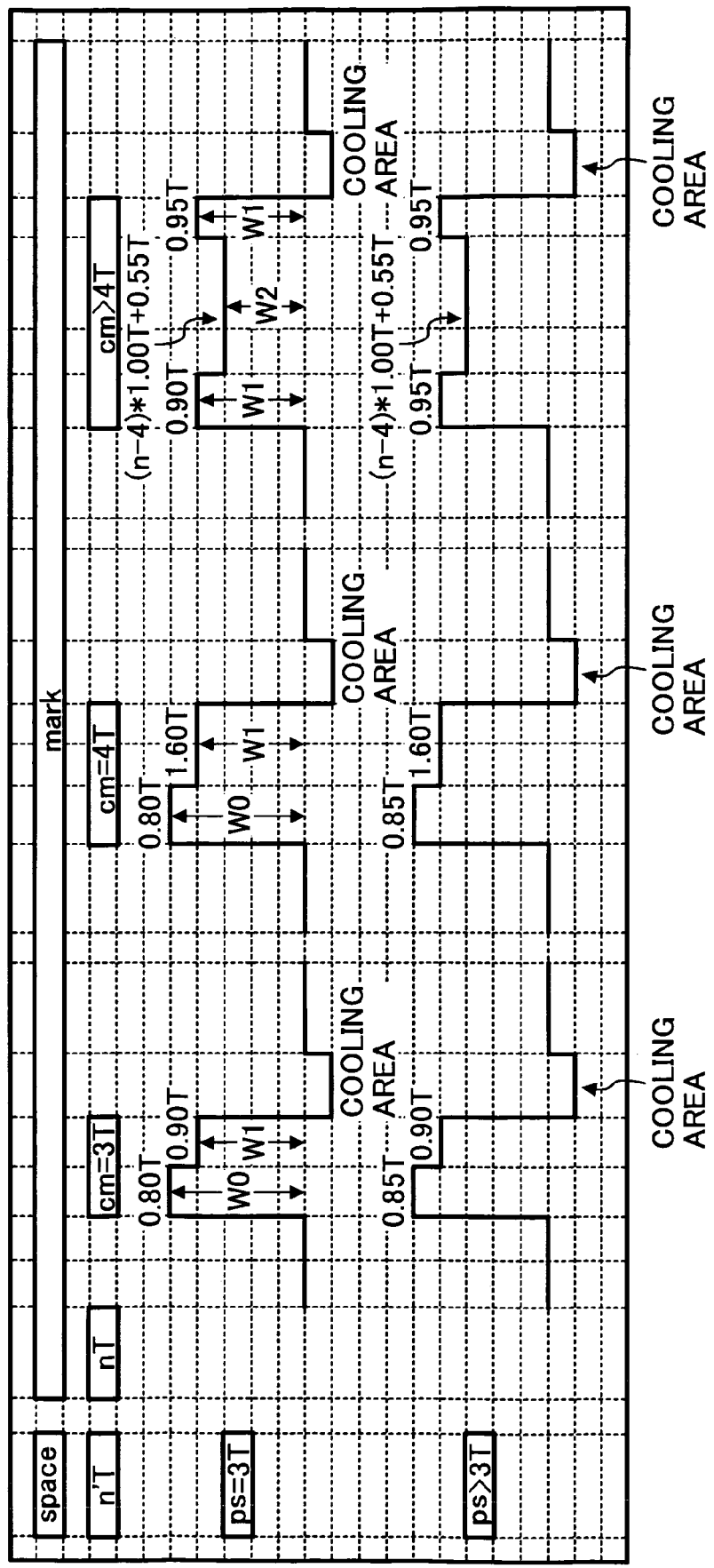
FIG. 12 is a diagram illustrating another example of the waveform of the light pulses of the present invention for a recording linear velocity of 56 m/s.
Figure 13:
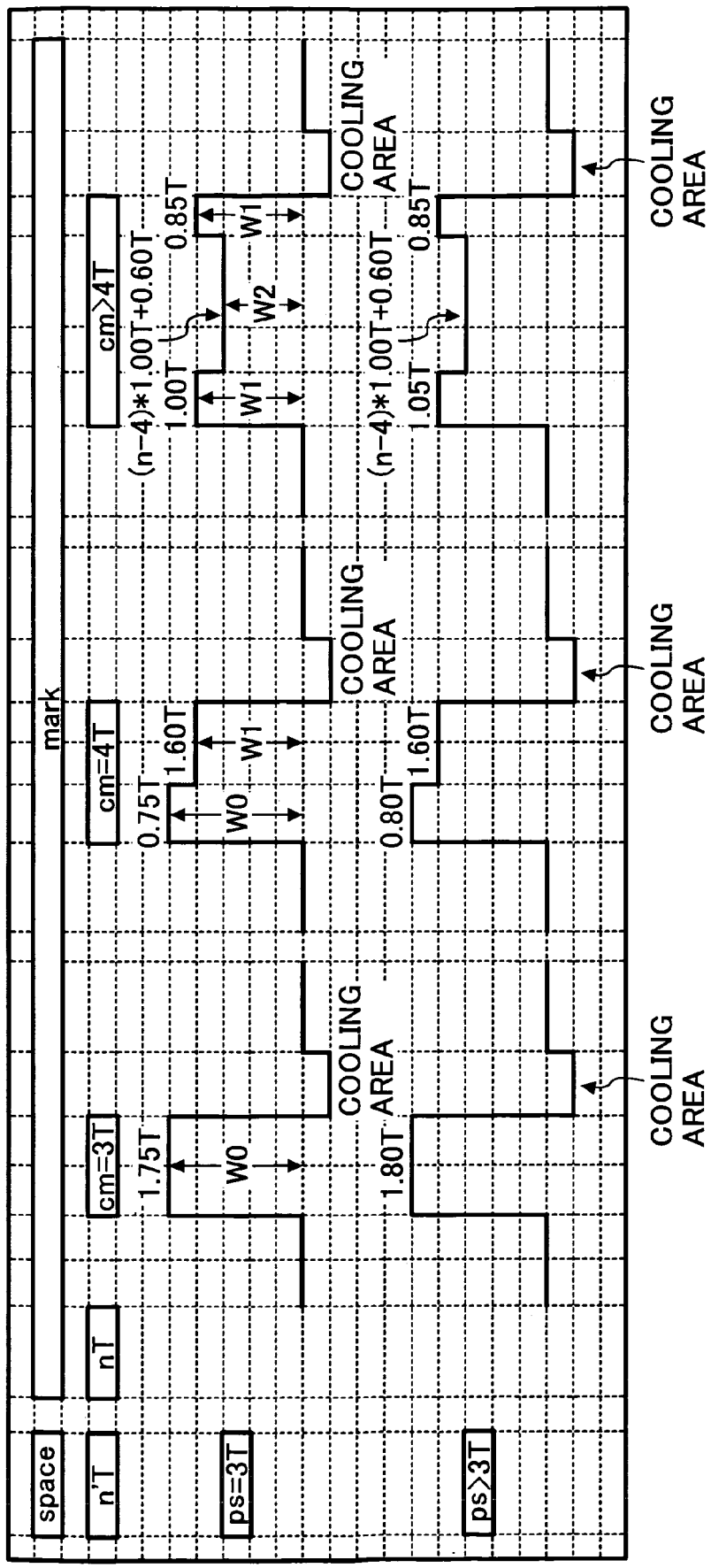
FIG. 13 is a diagram illustrating another example of the waveform of the light pulses of the present invention for a recording linear velocity of 56 m/s.

FIGS. 12 and 13 are waveform diagrams illustrating examples of the recording pulse waveforms which are formed by a single light pulse containing a recording area having a power level of W0 for the front end portion of a mark having the shortest length and a power level of W0 or W1 for the rest portion thereof, a single light pulse containing a recording area having a power level of W0 for the front end portion of a mark having the second shortest length and a power level of W1 for the rest portion thereof and a single light pulse containing a recording area having a power level of W1 for the front end portion and the rear end portion of a mark having the third shortest length or longer, and a power level of W2 for the rest portion thereof. In this case, the power level for at least the front end portion of the mark having the shortest length and the power level for the front end portion of the mark having the second shortest length are raised, namely the power level W0, and the power for the front end portion and the rear end portion of the mark having the third shortest length or longer is raised to the power level W1, which is lower than W0. The power level W1 is also used for the rest portions of the mark having the shortest length and the mark having the second shortest length.

Figure 14:
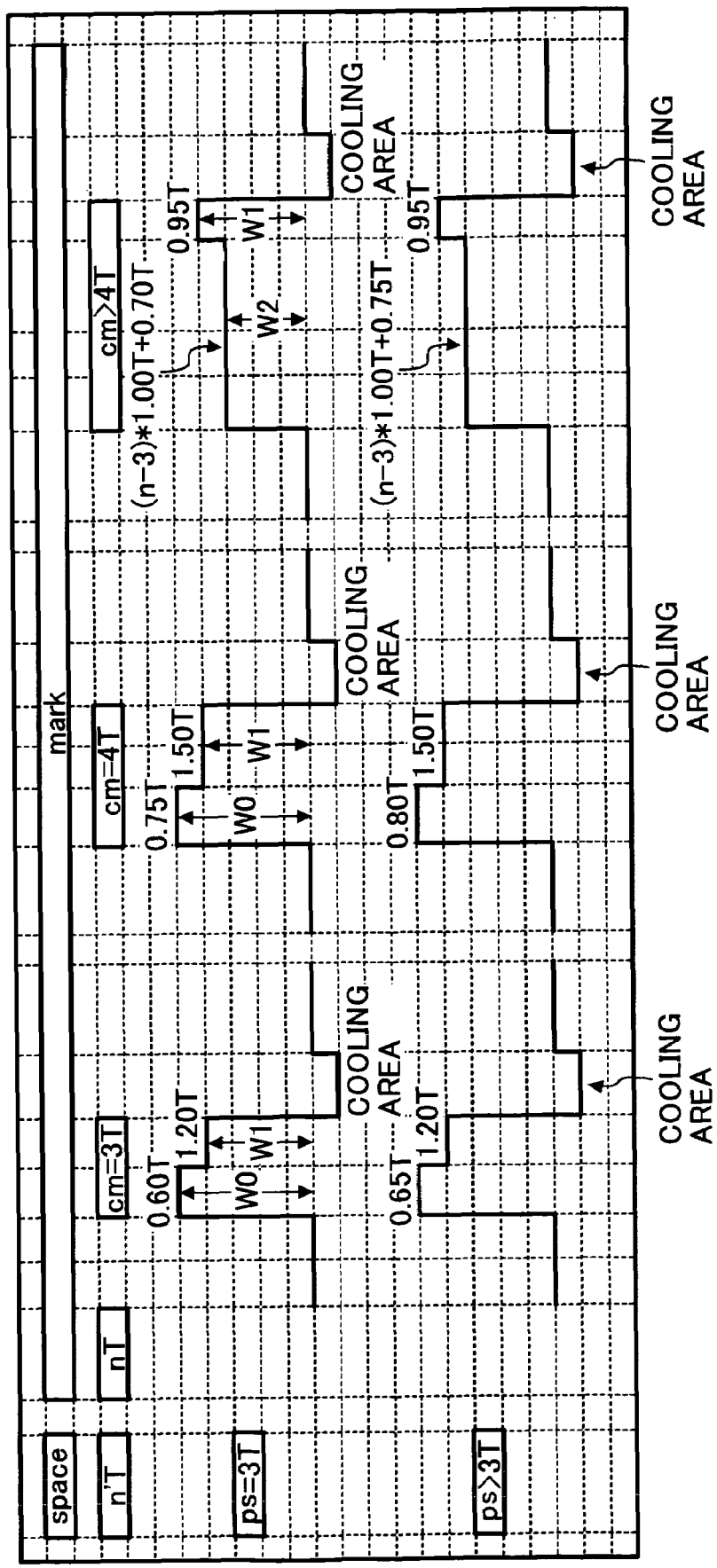
FIG. 14 is a diagram illustrating another example of the waveform of the light pulses of the present invention for a recording linear velocity of 42 m/s.
Figure 15:
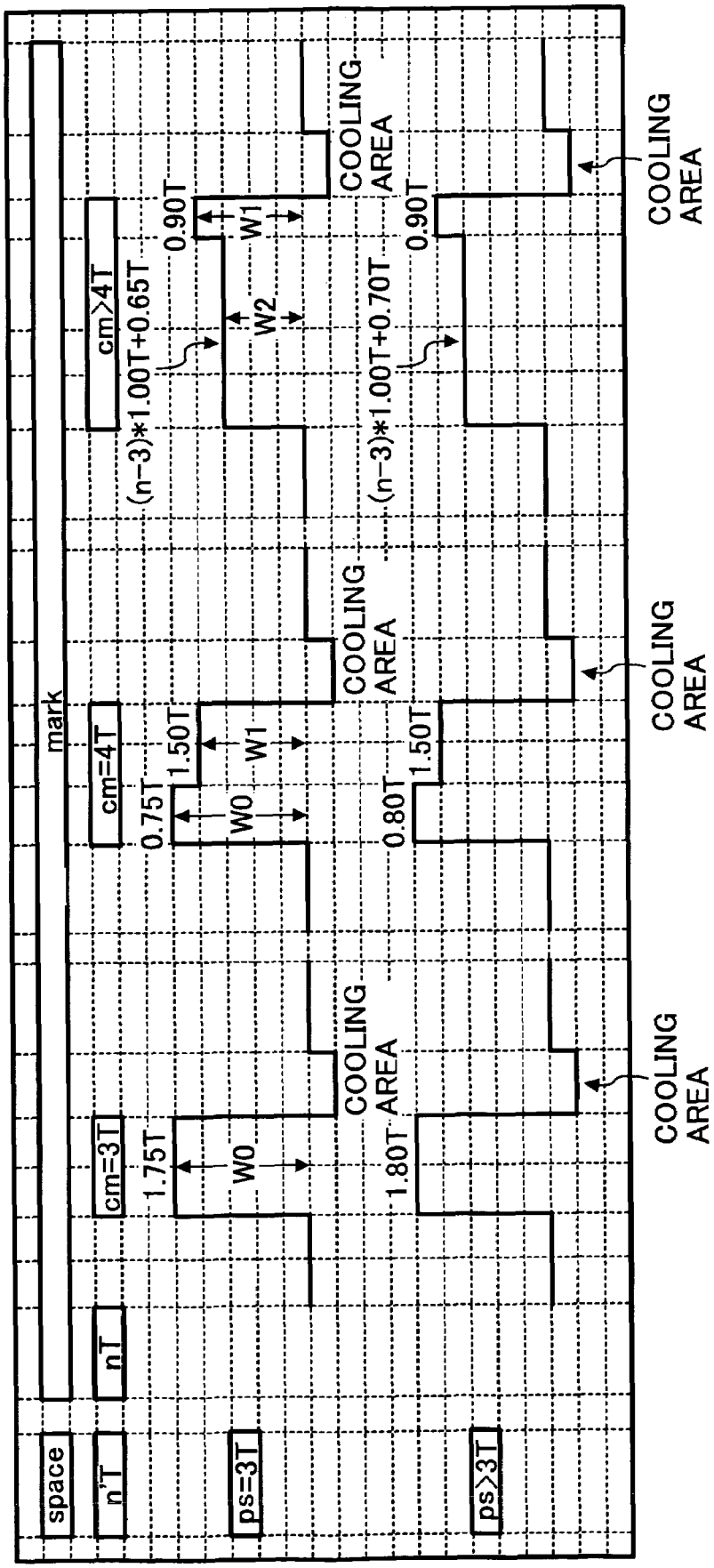
FIG. 15 is a diagram illustrating another example of the waveform of the light pulses of the present invention for a recording linear velocity of 42 m/s.

FIGS. 14 and 15 are waveform diagrams illustrating examples of the recording pulse waveforms which are formed by a single light pulse containing a recording area having a power level of W0 for the front end portion of a mark having the shortest length and a power level of W0 or W1 for the rest portion thereof, a single light pulse containing a recording area having a power level of W0 for the front end portion of a mark having the second shortest length and a power level of W1 for the rest portion thereof and a single light pulse containing a recording area having a power level of W1 for the rear end portion of a mark having the third shortest length or longer and a power level of W2 for the rest portion end portion. The difference between the waveforms illustrated in FIGS. 12 and 13 and those illustrated in FIGS. 14 and 15 is whether the power level of the front end portion of the mark having the third shortest length or longer is raised to W1.

Low jitters can be obtained when using the pulses illustrated in FIGS. 12 and 13. However, since the power level for a mark having the third shortest length or longer is necessary to be raised twice, it is not easy to expand this pattern among the commercialized drives.

In contrast, the pulse patterns illustrated in FIGS. 14 and 15 can be easily expanded among the commercialized drives because it is possible to select almost all the parameters in common among the drives except for raising the power level only for the rear end portion of each mark having the third shortest length or longer. However, the media are still required to obtain good jitter results even when the recording waveform patterns for use in optical recording media are simple.

Figure 16:
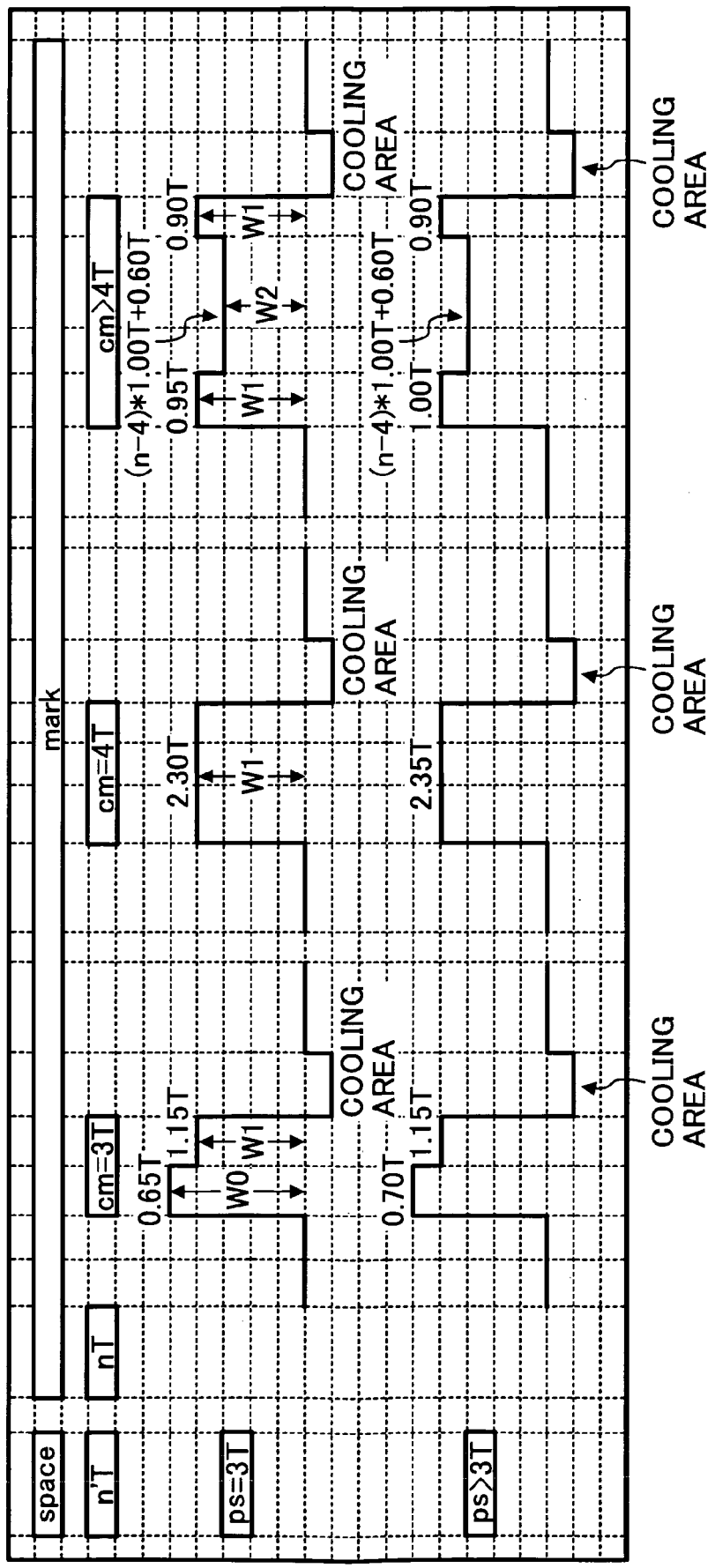
FIG. 16 is a diagram illustrating another example of the waveform of the light pulses of the present invention for a recording linear velocity of 42 m/s.
Figure 17:
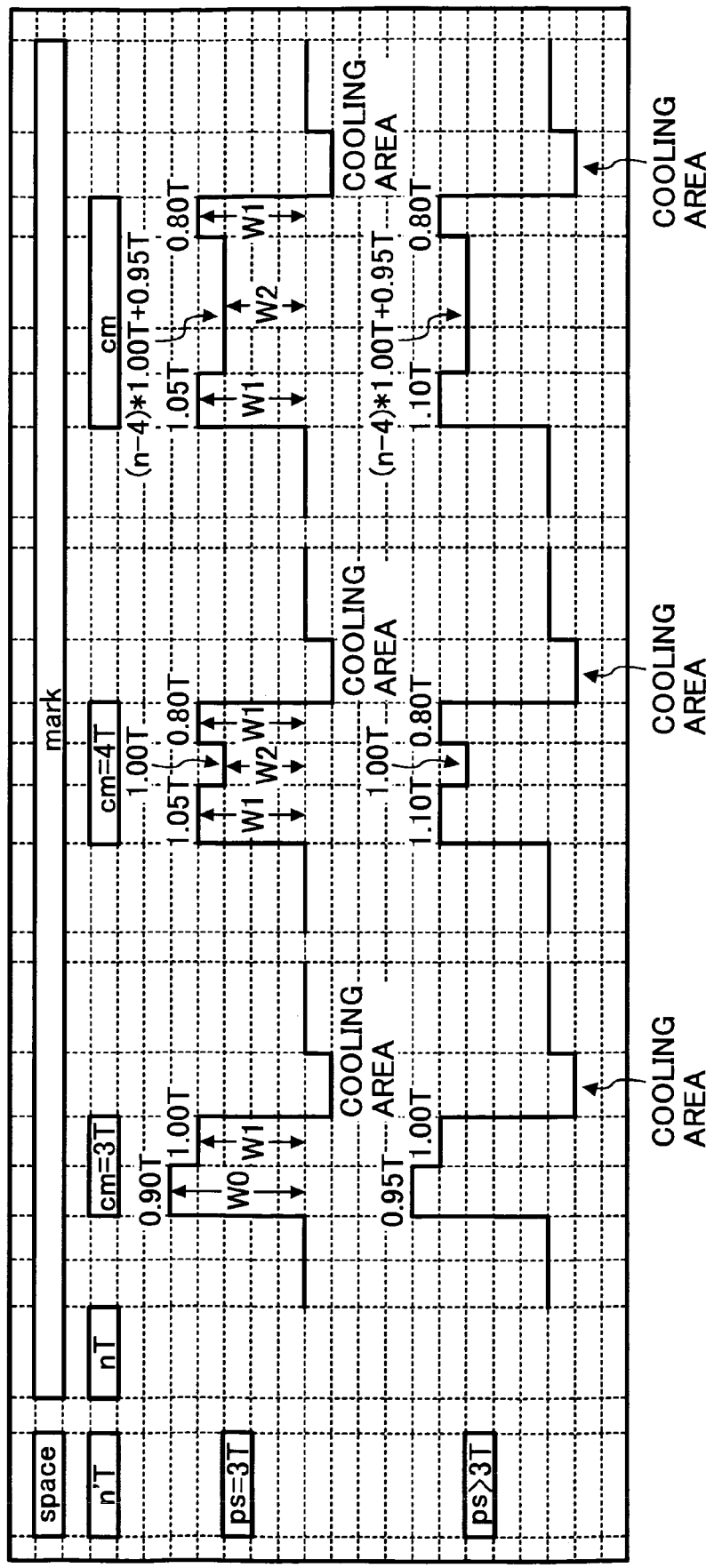
FIG. 17 is a diagram illustrating another example of the waveform of the light pulses of the present invention for a recording linear velocity of 56 m/s.

FIGS. 16 and 17 are waveform diagrams illustrating examples of the recording pulse waveforms which are formed by a single light pulse containing a recording area having a power level of W0 for the front end portion of a mark having the shortest length and a power level of W1 for the rest portion thereof, a single pulse containing a recording area having a power level of W1 for the entire portion of a mark having the second shortest length or a power level of W1 for the front end portion and the rear end portion thereof and a power level of W2 for the rest portion thereof, and a single light pulse containing a recording area having a power level of W1 for the front end portion and the rear end portion of a mark having the third shortest length or longer, and a power level of W2 for the rest portion thereof. In FIG. 16, the power level for the front end portion of the mark having the shortest length is raised to the power level W0, and the recording area in the single light pulse for the mark having the second shortest length is a simple square waveform having a power level of W1. Further, the power level for the front end portion and the rear end portion of the mark having the third shortest length or longer is raised to the power level W1, which is lower than W0. The power level W1 is also used for the rest portions of the mark having the shortest length and for the mark having the second shortest length. In FIG. 17, the power level for the front end portion of the mark having the shortest length is raised to the power level W0. Further, the base power level for the mark having the third shortest length or longer is W2 and the power level for the front end portion and the rear end portion thereof is raised to the power level W1, which is lower than W0. The power level W1 is also used for the rest portions of the mark having the shortest length and for the mark having the second shortest length. The power level for the front end portion and the rear end portion of the mark having the third shortest length or longer is raised to the power level W1, which is lower than W0. The power level W1 is also used for the rest portions of the mark having the shortest length and for the front end portion and the rear end portion of the mark having the second shortest length.

Figure 18:
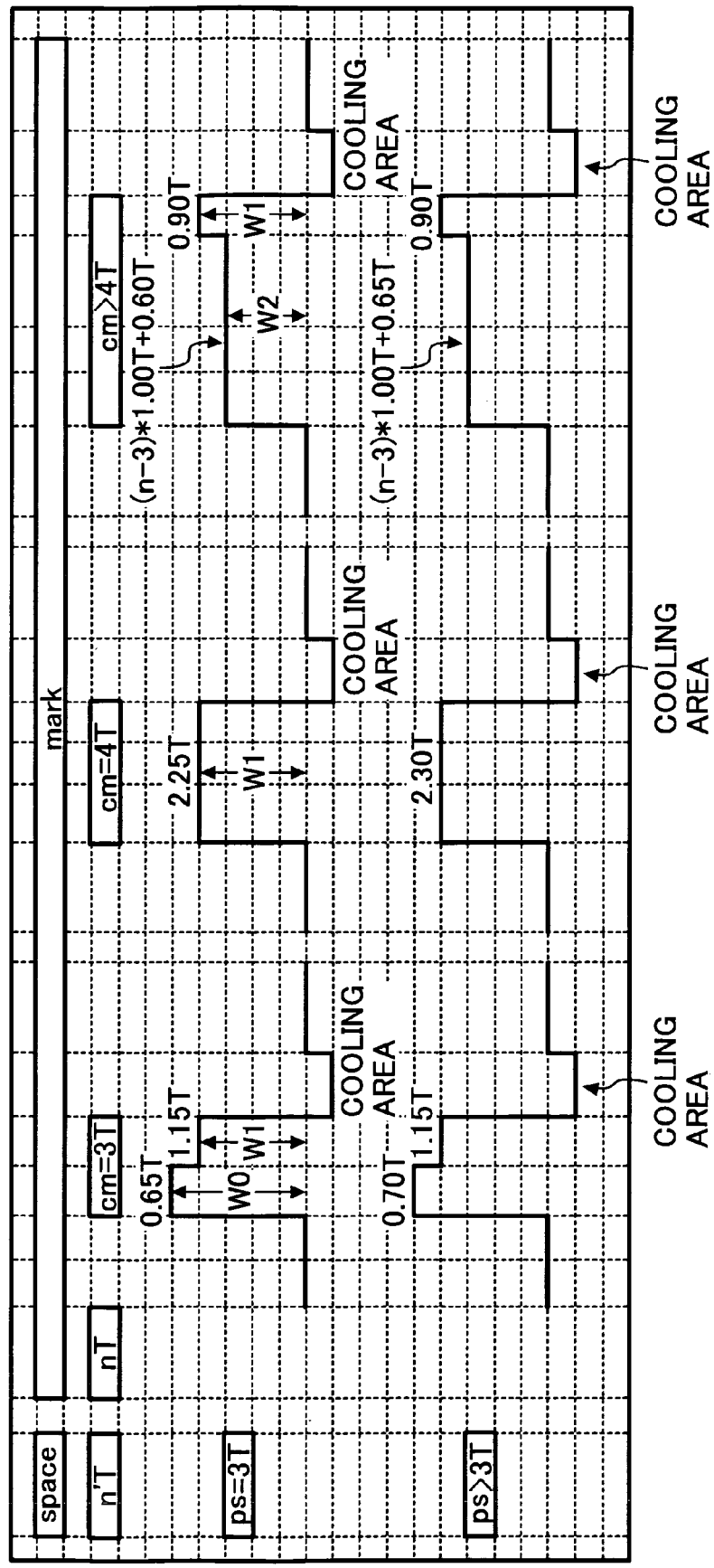
FIG. 18 is a diagram illustrating another example of the waveform of the light pulses of the present invention for a recording linear velocity of 56 m/s.
Figure 19:
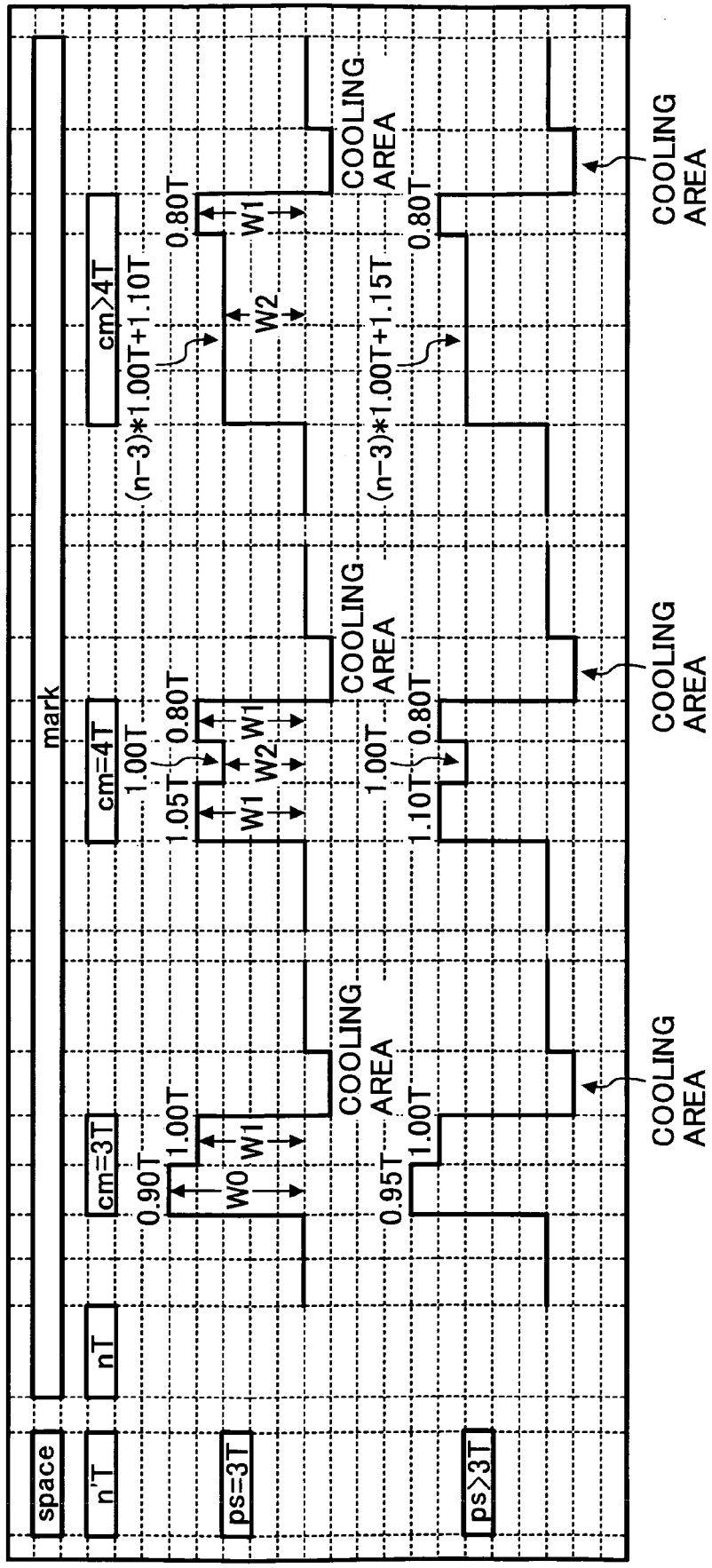
FIG. 19 is a diagram illustrating another example of the waveform of the light pulses of the present invention for a recording linear velocity of 56 m/s.
Figure 20:
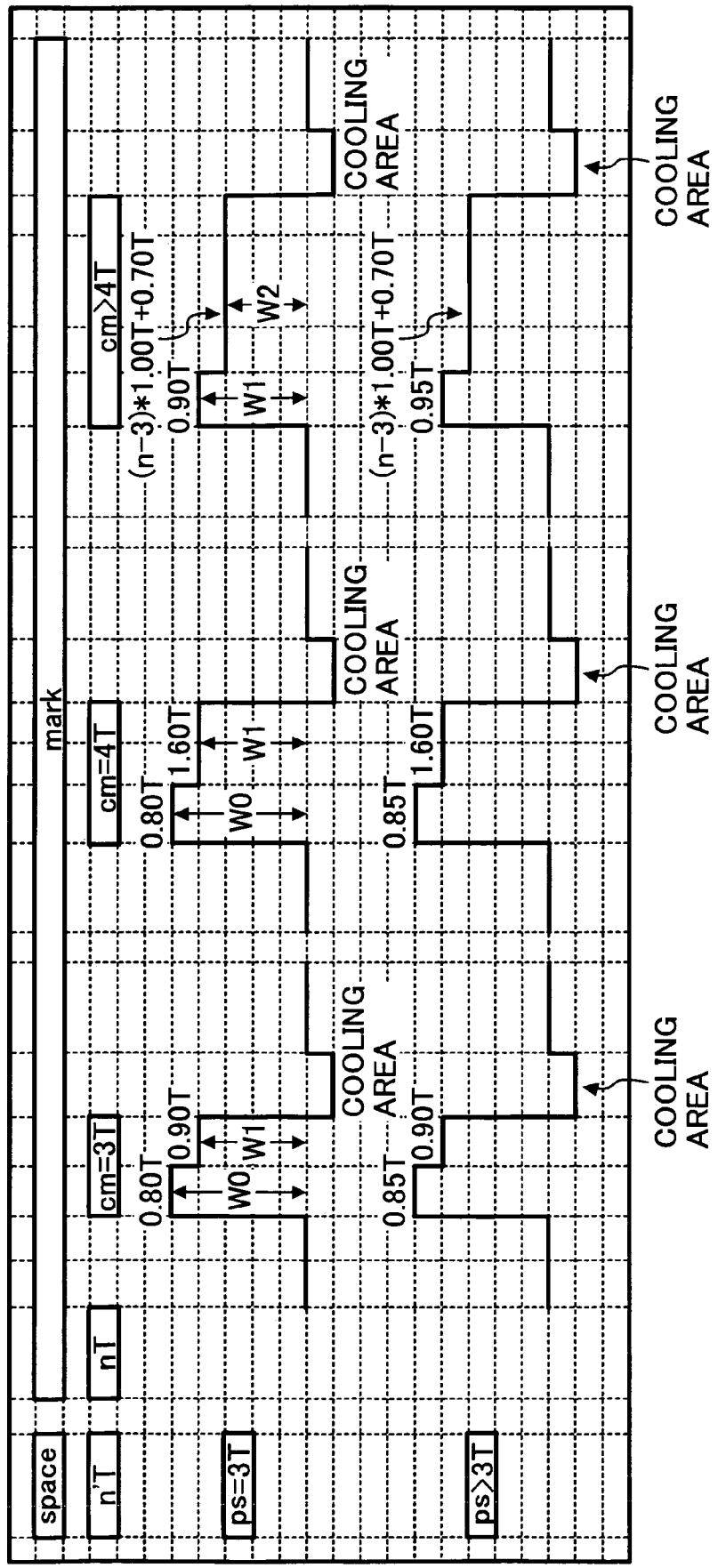
FIG. 20 is a diagram illustrating another example of the waveform of the light pulses of the present invention for a recording linear velocity of 56 m/s.

In addition, FIGS. 18 and 19 are waveform diagrams illustrating examples of the recording pulse waveforms which are formed by a single light pulse containing a recording area having a power level of W0 for the front end portion of a mark having the shortest length and a power level of W1 for the rest portion thereof, a single light pulse containing a recording area having a power level of W1 for the entire portion of the mark having the second shortest length or a power level of W1 for the front end portion and the rear end portion thereof and a power level of W2 for the rest portion thereof, and a single light pulse containing a recording area having a power level of W1 for the rear end portion of a mark having the third shortest length or longer and a power level of W2 for the rest portion thereof. The difference between the waveforms illustrated in FIGS. 16 and 17 and those illustrated in FIGS. 18 and 19 is whether the power level of the front end portion of the mark having the third shortest length or longer is raised to W1.

Low jitters can be similarly obtained when using the pulses illustrated in FIGS. 16 and 17 as those illustrated in FIGS. 12 and 13. However, since the power level for the mark having the third shortest length or longer is necessary to be raised twice, it is not easy to expand this pattern among the commercialized drives.

In contrast, the pulse patterns illustrated in FIGS. 18 and 19 can be easily expanded among the commercialized drives because it is possible to select almost all the parameters in common among the drives except for raising the power level only for the rear end portion of each mark having the third shortest length or longer as those illustrated in FIGS. 14 and 15. However, the media are still required to obtain good jitter results even when the recording waveform patterns for use in optical recording media are simple.

In addition, considering influence of the thermal interference, the width of the front end portion of a heating light pulse for forming a mark can be set depending on whether the mark has the shortest length to obtain low jitters when the space prior to the mark has the shortest length. In this case, the width of the front end portion of the heating light pulse for forming a mark having the shortest length is set to be longer than the width of the front end portion of the heating light pulse for a mark having a length longer than the shortest length. Specific examples are shown in Table 1 (the space length: 3 T, the recording mark length: 3 T and 4 to 14 T).

Further, the width of the front end portion heating pulse of a recording pulse forming a mark can be set depending on whether the space prior to the mark has the shortest length when the mark has the shortest length to obtain further low jitters. In this case, the width of the front end portion heating pulse for the mark having the shortest length is set to be shorter than the width of the front end portion heating pulse for the mark having a length longer than the shortest length. Specific examples are shown in Table 1 (the recording mark length: 3 T, the space length: 3 T and 4 to 14 T).

The correction amount (i.e., length) for setting the width of the front end portion of a heating light pulse mentioned above to be short is particularly preferably from 0.02 to 0.10 T. When the space prior to a mark to be formed has the shortest length and the width of the front end portion of a heating light pulse forming the mark has almost the same length as the width of the front end portion of a heating light pulse forming a mark whose prior space has a length longer than the shortest length, jitters may slightly deteriorate because the shortest space prior to the mark can be short due to thermal interference. In this case, it is effective to shorten the width of the front end portion of a heating light pulse forming a mark whose prior space has the shortest length to improve jitters.

In addition, when the width of the front end portion of a heating light pulse forming a mark whose prior space has the shortest length is narrower than 0.10 T, it is not preferred because the length of the mark itself becomes too short.

The correction amount (i.e., length) for the width of the front end portion of a heating light pulse for forming a mark having the shortest length to be longer than that of the width of the front end portion of a heating light pulse for forming a mark having a length longer than the shortest length is preferably from 0.05 to 0.25 T. The width of the front portion of a heating light pulse for forming a mark having the shortest length is necessary to be set longer in the range of the correction amount mentioned above especially when recording is performed at a high linear velocity. This is because it is difficult to correctly form a mark having the shortest length at a high linear velocity recording.

Specific examples of the correction amounts to the width of the front end portion of a heating light pulse are shown in Table 2.

TABLE 2

|  |  | Length of mark to be recorded | |
| --- | --- | --- | --- |
|  |  | 3 T | 4 to 14 T |
| Length of space prior to mark | 3 T | 0.00 T | −0.05 T |
|  | 4 to 14 T | +0.05 T | 0.00 T |

The necessary matter to a recording layer is optical characteristics.

As optical characteristics, it is preferred that the refraction index n of a sole recording layer to a light in the wavelength range around the recording and reading wavelength, namely the wavelength in the range of from −5 nm to +5 nm to the wavelength of the recording light and reading light, is from 1.5 to 3.0 and the extinction index k of a sole recording layer is from 0.02 to 0.2. When the refraction index n is too small, it is not preferred because sufficient optical changes are not obtained, meaning that recording modulation level becomes low. When the refraction index n is too large, it is not preferred because wavelength dependency is high, resulting in occurrence of errors even in the recording and reading wavelength area. In addition, when the extinction coefficient k is too small, it is not preferred because the recording sensitivity deteriorates. When the extinction coefficient k is too large, it is not preferred because it is difficult to obtain a reflection index not less than 50%.

In the case of DVDs, the wavelength of a light source for a device dedicated for reading of DVDs is regulated to be around 650 nm. The wavelength of a recording light for recordable DVD media is regulated to be from 650 to 660 nm for a general purpose and 635 nm for media dedicated for authoring. However, these wavelengths are central wavelengths and therefore actual wavelengths fluctuate to the short wavelength side or the long wavelength side due to the level of manufacturing accuracy of laser diodes (LD). In addition, the wavelength of a laser diode generally shifts to the long wavelength side when the temperature thereof rises. The method of the present invention can be performed in the range of from 600 to 720 nm including the wavelength ranges mentioned above.

The wobbling characteristics of a meandering guide groove provided on a substrate in an optical information recording medium are described next. For a DVD medium (4.7 GB), the basic clock cycle T, which is used to determine the wobbling frequency, is about 0.133 μm and about 38 nsecs.

The wobbling frequency band typically used is the band corresponding to 150 to 400 T. However, this frequency band is not suitable for high density recording because, when data are added to data recorded earlier, the gap created therebetween is considerably wide irrespective of the modulation used, i.e., frequency modulation or phase modulation. In contrast, for DVD-Rs, LPP signals are used to control recording positions of data. However, when the amplitude of LPP signals is too small, the LPP signals are not properly read. To the contrary, when the amplitude of LPP signals is too large, the LPP signals cross into recorded data, resulting in frequent data errors. It is thus necessary to limit LPP signals in the range of from 0.18 to 0.26 and preferably from 0.18 to 0.26 by minutely controlling the cut width in land portions when manufacturing a stamper.

Nonetheless, LPP signals are made to be unnecessary when a wobbled guide groove having a high frequency is adopted. Different from the LPP signal system, frequent data errors do not occur in the high frequency wobbled guide groove system because its wobbling is modulated for synchronization. Preferred frequency for the high frequency wobbled guide groove is from 4 to 96 T as regulated in the present invention. When the frequency is too high, it is difficult to detect wobbling, which causes problems such as rotation control and address detection reliability. When the frequency is too low, the gap created in a joint portion is too wide when adding data in a medium, which leads to problems such as reduction in storage capacity and decrease in data processing speed.

Synchronization by wobbling, which is one of the objectives of the present invention, is easy when the wobbling amplitude of a DVD medium targeted by the present invention satisfies the following relationship: the ratio (Wo/PP) of the wobbling amplitude (Wo) of a signal passed through a filter, for example, a high and low pass filter of 4 MHz and 30 kHz, to the push-pull signal (PP) passed through a filter, for example, a 30 kHz filter, is from 0.1 to 0.4, and preferably from 0.15 to 0.30. When the ratio (Wo/PP) is too small, the signal is not strong enough for synchronization. When the ratio (Wo/PP) is too large, errors in data portions tend to increase. But when compared with those in the LPP signal system, the influence on the number of data errors in wobbling synchronization system is relatively moderate when the wobbling amplitude increases.

Further, when manufacturing a stamper, the cut width controlling technology required to limit the LPP cut width in the LPP signal system to the range of from 0.16 to 0.32 mentioned above is a high level technology. But in the high frequency wobbled guiding groove system of the present invention, the objective is achieved by just controlling a source generating high frequency and the amplitude of wobbling. The amplitude of wobbling can be arbitrarily controlled with good reproducibility by using a circuit controlling the amplitude of wobbling. Thereby, the yield of stampers and media can be greatly improved.

The groove form of a substrate having the format mentioned above is now described taking an example of forming a recording layer on the substrate by a solvent coating method using an organic dye. The depth of the groove is preferably from 100 to 250 nm and more preferably from 150 to 200 nm. When the depth of the groove is too shallow, push-pull signals are not sufficiently retrieved so that tracking control is impossible. When the depth of the groove is too deep, it is not preferred because the transfer property at the time of molding a substrate deteriorates.

Further, the groove depth (d1) of a dye when a dye recording layer is provided on the substrate preferably satisfies the following condition: $1{,}200 < \text{or} = d1 \times m < \text{or} = 160{,}000$, wherein m represents a natural number in mT representing a wobbling frequency. When $d1 \times m$ is too small, it is impossible to obtain a sufficient differential signal and thereby tracking is not sufficiently performed at recording and reading. When $d1 \times m$ is too large, it is not preferred because the oscillation is reversed and therefore tracking is impossible. Further, due to the limit of the substrate groove depth ascribable to the transfer property at the time of molding a substrate mentioned above, $d1 \times m$ is practically not allowed to surpass 160,000.

In addition, the track pitch is necessary to be from about 0.64 to about 0.8 μm to secure a storage capacity of 4 to 5 GB. As to the groove width, it depends on recording materials but a half value of 0.18 to 0.40 μm can be applicable to almost all organic materials.

Next, the layer structure of a dye based write-once DVD medium of the present invention, requisitions for its characteristics and composition materials of each layer are described.

Figure 2A:
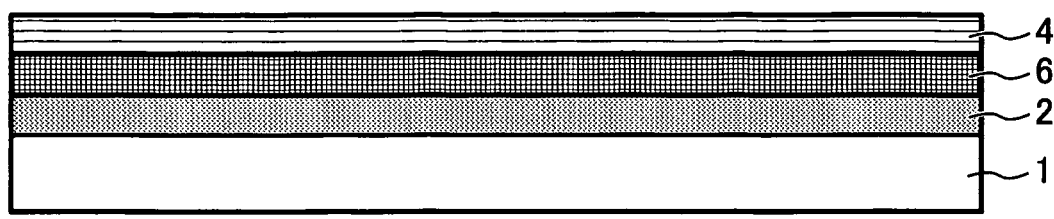
FIGS. 2A to 2C are diagrams illustrating examples of layer structures of a typical CD medium.
Figure 2B:
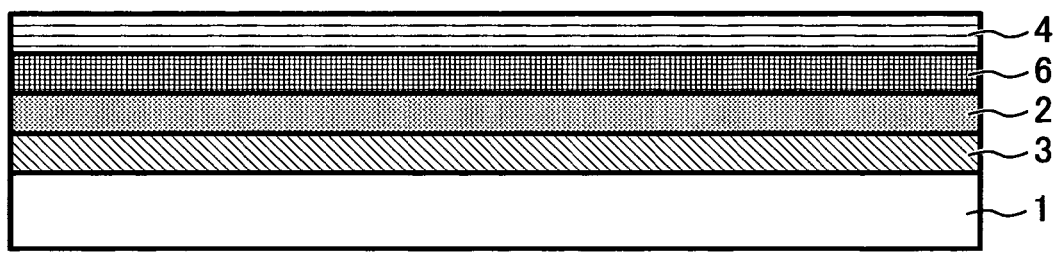
Figure 2C:
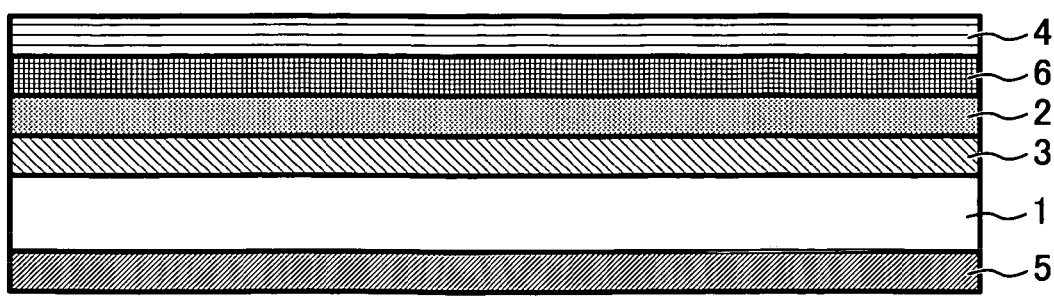
Figure 3A:
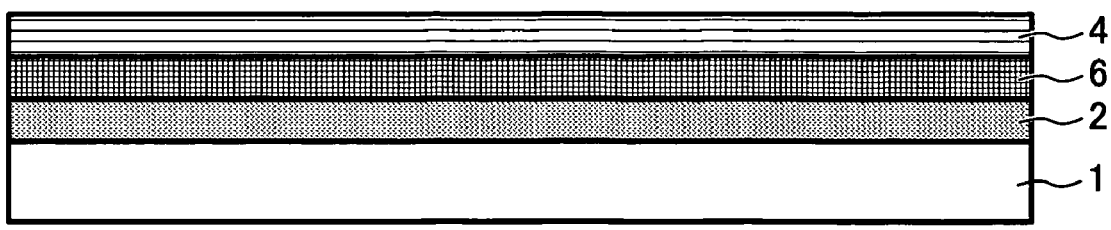
FIGS. 3A to 3C are diagrams illustrating examples of layer structures of dye containing write-once DVD medium.
Figure 3B:
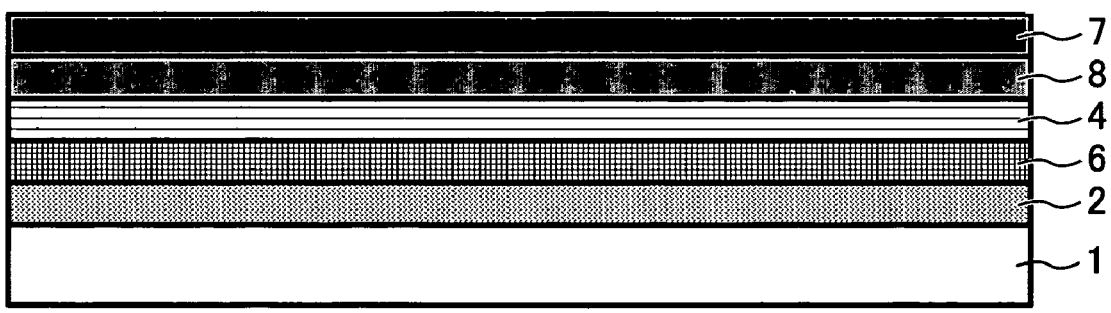
Figure 3C:
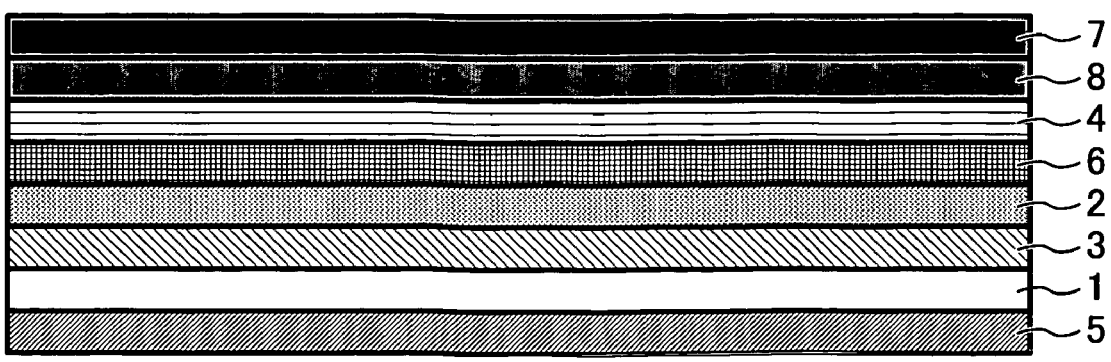

FIGS. 1A to 1D are diagrams illustrating examples of layer structures of a typical write-once optical disc. FIGS. 2A to 2C are diagrams illustrating examples of layer structures of a typical CD-R medium. FIGS. 3A to 3C are diagrams illustrating layer structures of a write-once DVD medium. The dye based write-once DVD media of the present invention preferably have layer structures in which a first substrate is adhesively attached to a second substrate (i.e., a protective layer) with a recording layer therebetween as illustrated in FIGS. 3B and 3C. Numerals 1, 2, 3, 4, 5, 6, 7 and 8 represent a substrate, a recording layer, an undercoat layer, a protective layer, a hard coat layer, a reflective layer, a protective layer, and an adhesive layer, respectively.

The recording layer can be a sole layer made of an organic dye or two accumulated layers containing an organic dye layer and a reflective layer to obtain a good reflectivity. An undercoat layer or a protective layer can be provided between the recording layer and the substrate. In addition, each layer can have an accumulated layer structure having at least two layers to improve its function. The most typical layer structure is a first substrate, an organic dye layer, a reflective layer, a protective layer, an adhesive layer and a second substrate (a protective substrate).

<Substrate>

The substrate is necessary to be transparent to a laser beam when recording and reading are performed from the side of the substrate. But the substrate is not necessary to be transparent when recording and reading are performed from the side of the recording layer. Specific examples of preferred materials for the substrate include plastics such as polyester resins, acrylic resins, polyamide resins, polycarbonate resins, polyolefin resins, phenolic resins, epoxy resins and polyimide resins, glass, ceramics and metals. A guide groove or pits for tracking and further a preformat such as address signals can be formed on the surface of the substrate.

<Recording Layer>

Information is recorded in a recording layer by irradiating the recording layer with a laser beam to cause some optical changes therein. Materials mainly containing organic dyes are used for the recording layer. "Mainly containing" means that the recording layer contains enough amount of organic dyes to perform recording and reading. Typically the recording layer contains only organic dyes except for a small amount of additives added thereto when necessary.

Specific examples of such organic dyes include azo dyes, formazan dyes, dipyrromethene dyes, (poly)methine dyes, naphtalocyanine dyes, phtalocyanine dyes, tetraazaporphyrin dyes, a squarilium dyes, croconium dyes, pyrylium dyes, naphthoquinone dyes, anthraquinone (indanthrenen) dyes, xanthene dyes, triphenylmethane dyes, azulene dyes, tetrahydrocoline dyes, phenanthrene dyes, triphenothiazine dyes and their metal complexes. Among them, azo (metal chelate) dyes, formazane (metal chelate) dyes, squarilium (metal chelate) dyes, dipyrromethene (metal chelate) dyes, trimethine cyanine dyes and tetraazaporphyrin dyes are preferred.

These dyes preferably have a dissolve starting temperature of from 100 to 360° C. and particularly preferably from 100 to 350° C. as heat dissolve characteristics. When the dissolve starting temperature is too high, pits are not properly formed at recording, resulting in deterioration of jitter characteristics. When the dissolve starting temperature is too low, preservation stability of a disc deteriorates.

Other organic dyes, metals and metal compounds can be mixed with the dyes mentioned above to improve optical characteristics, recording sensitivity, signal characteristics, etc. Another layer formed of organic dyes, metals and metal compounds can be accumulated on the dye layer.

Specific examples of such metal and metal compounds include In, Te, Bi, Se, Sb, Ge, Sn, Al, Be, $TeO_2$, SnO, As and Cd. Each of them can be dispersed in and mixed with the dye layer or accumulated thereon.

Further, polymer materials such as ionomer resins, polyamide resins, vinyl resins, natural polymers, silicone and liquid rubber, or silane coupling agents can be dispersed and mixed in the dyes mentioned above. In addition, stabilization agents (e.g., transition metal complexes), dispersants, flame retardants, lubricants, antistatic agents, surface active agents, plasticizers can be also used to improve characteristics of the recording layer.

Recording layers can be formed by typical methods such as deposition methods, sputtering methods, chemical vapor deposition (CVD) methods and solvent coating methods. When an solvent coating method is used, after the dyes mentioned above is dissolved in an organic solvent, the resultant is applied by conventional coating methods such as spray coating methods, roller coating methods, dipping methods and spin coating methods. Specific examples of such organic solvents include alcohols such as methanol, ethanol and isopropanol; ketones such as acetone, methylethyl ketone and cyclohexanone; amides such as N,N-dimethylformamide and N,N-dimethylacetoamide; sulfoxides such as dimethylsulfoxide; ethers such as tetrahydrofuran, dioxane, diethylether and ethylene glycol monomethylether; esters such as methyl acetate and ethyl acetate; aliphatic halogenated hydrocarbons such as chloroform, methylene chloride, dichloroethane, carbon tetrachloride and trichloroethane; aromatic series compounds such as benzene, xylene, monochlorobenzene and dichlorobenzene; cellosolve series such as methoxyethanol and ethoxyethanol; and hydrocarbons such as hexane, pentane, cyclohexane and methylcyclohexne.

The thickness of a recording layer is from 0.01 to 10 μm and preferably from 0.02 to 0.2 nm.

<Undercoat Layer>

An undercoat layer is provided, for example, to (1) improve the adhesive property, (2) provide protection from water, gas, etc., (3) improve the reservation stability of the recording layer, (4) improve the reflective index, (5) protect the substrate from solvents, and (6) form a guide groove, guide pits and preformats. To improve the adhesive property, polymers such as ionomer resins, polyamide resins, vinyl resins, natural resins, natural polymers, silicones and liquid rubbers or silane coupling agents can be used. To provide protection from water, gas, etc., and to improve the reservation stability of the recording layer, in addition to the polymers mentioned above, inorganic compounds such as SiO, MgF, $SiO_2$, TiO, ZnO, TiN and SiN, metals or half metals such as Zn, Cu, Ni, Cr, Ge, Se, Au, Ag and Al can be used. To improve the reflective index, metals such as Al, Au and Ag and organic thin film having a metal gloss formed by, for example, methine dyes and xanthene dyes can be used. To protect the substrate from solvents and to form a guide groove, ultraviolet curing resins, heat curing resins and thermoplastic resins can be used.

The thickness of the undercoat layer is from 0.01 to 30 μm and preferably from 0.05 to 10 μm.

<Reflective Layer>

Specific examples of materials for use in the reflective layer include metals and half metals with a high reflective index and a high incorrosible property such as Au, Ag, Cr, Ni, Al, Fe and Sn. Among these, Au, Ag and Al are particularly preferred in terms of reflectivity index and productivity. These metals and half metals can be used alone or in combination as an alloyed metal.

Deposition methods and sputtering methods can be used to form a film and the thickness of the film is from 5 to 500 nm, and preferably from 10 to 300 nm.

<Protective Layer, Hard Coat Layer on Substrate>

The protective layer and the hard coat layer on the substrate are provided, for example, to (1) protect the recording layer (reflection and absorption layer) from flaws, dusts, dirts, etc., (2) improve the reservation stability of the recording layer (reflection and absorption layer), and (3) improve the reflectivity thereof. The same material as the materials mentioned above for the undercoat layer can be used to fulfill these purposes. In addition, organic materials such as thermosoftening resins and thermomelting resins such as polymethyl acrylate resins, polycarbonate resins, epoxy resins, polystyrene resins, polyester resins, cellulose resins, aliphatic hydrocarbon resins, natural rubbers, styrene-butadiene resins, chloroprene rubbers, waxes, alkid resins, drying oils and rosins can be also used. Among these, ultraviolet resins are most preferred in light of productivity.

The protective layer and the hard coat layer on substrate have a thickness of from 0.01 to 30 μm, and preferably from 0.05 to 10 μm.

In addition, the same stabilization agents (e.g., transition metal complexes), dispersants, flame retardants, lubricants, antistatic agents, surface active agents, plasticizers as those mentioned for the recording layer can be also contained in the protective layer and the hard coat layer on substrate.

<Protective Substrate>

The protective substrate is necessary to be transparent when a laser beam is irradiated from the side of the protective substrate. But the protective substrate is not necessary to be transparent when the protective substrate is used as a mere protective plate.

The materials which can be used for the protective substrate are totally the same as those for the substrate mentioned above, which are plastics such as polyester resins, acrylic resins, polyamide resins, polycarbonate resins, polyolefin resins, phenolic resins, epoxy resins and polyimide resins, glass, ceramics and metals.

<Adhesive Layer>

Any materials can be used for the adhesive layer as long as the material can bond the two recording media together. Considering productivity, ultraviolet curing resin type adhesive agents or hot melt type adhesive agents are preferred.

Next, the recording and reading device of the present invention is described.

Optical discs are used as media to record a large amount of information. Typically an optical disc drive (recording and reading device) records and plays back information in an optical disc. The structure of an optical disc and an optical disc drive is now schematically described below.

DVD-RAM WOs, DVD-Rs, DVD+Rs, DVD-RAMs, DVD-RWs, DVD+RWs are writable (recordable) Digital Versatile Discs (DVDs). DVD-RAM WOs, DVD-Rs, DVD+Rs are DVDs in which information can be recorded only once. These DVDs are referred to as write-once DVDs. DVD-RAMs, DVD-RWs, DVD+RWs are rewritable optical discs. Recording and playing back information in these optical discs are performed by, for example, a drive illustrated in FIG. 21.

Figure 21:
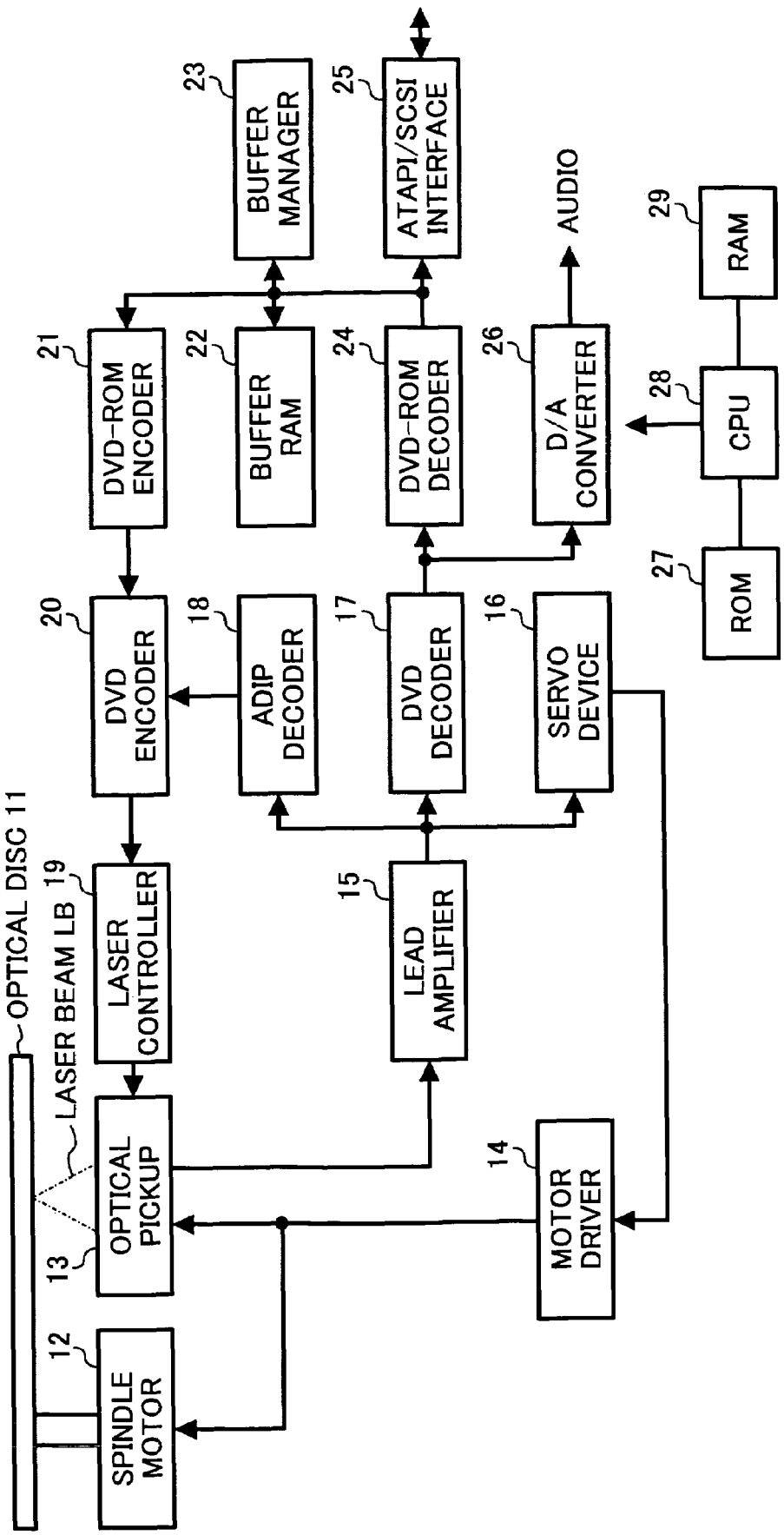
FIG. 21 is a diagram illustrating an example of the configuration of the optical disc drive of the present invention.

FIG. 21 is a function block diagram illustrating an example of the structure of the optical disc drive of the present invention. In FIG. 21, 11 represents an optical disc, 12 represents a spindle motor, 13 represents an optical pickup, 14 represents a motor driver, 15 represents a read amplifier, 16 represents a servo device, 17 represents a DVD decoder, 18 represents an ADIP decoder, 19 represents a laser controller, 20 represents a DVD encoder, 21 represents a DVD-ROM encoder, 22 represents a buffer RAM, 23 represents a buffer manager, 24 represents a DVD-ROM decoder, 25 represent an ATAPI/SCSI interface, 26 represents a D/A converter, 27 represents a ROM, 28 represents a CPU, 29 represents RAM, LB represents a laser beam and Audio represents an audio output signal.

In FIG. 21, the arrows represent the main directions of data flow. For simplification, only a bold line is attached to the CPU 28 controlling each block in FIG. 21 and the connections to each block are not shown. The ROM 27 contains a control program written by a code readable to the CPU 28. When an optical disc drive is powered on, the program mentioned above is loaded onto a main memory (not shown), the CPU 28 controls behaviors of each portion mentioned above following the instructions of the program and temporarily stores data necessary for control, etc. in the RAM 29.

The structure and behaviors of the optical disc drive are as follows. The optical disc 11 is rotationally driven by the spindle motor 12. The spindle motor 12 is controlled by the motor driver 14 and the servo device 16 to maintain the linear velocity or the angular velocity constant. The linear velocity or the angular velocity can be changed in an incremental manner.

The optical pickup 13 contains a semiconductor laser (not shown), an optical system, a focus actuator, a track actuator, a photo acceptance unit and a position sensor and irradiates the optical disc 11 with the laser beam LB. The optical pickup 13 can move to the sledge direction by a seek motor. The focus actuator, the track actuator and the seek motor are controlled by the motor driver 14 and the servo driver 16 according to the signals obtained from the photo acceptance unit and the position sensor such that the laser beam spot of the laser beam LB is positioned in a desired position on the optical disc 11.

At the time of reading, the reading signals obtained by the optical pickup 13 are amplified by the read amplifier 15, are binarized and are input into the DVD decoder 17. The input binarized data are 8/16 demodulated at the DVD decoder 17. The recorded data are 8/16 modulated 8 bits by 8 bits, meaning that 8 bits are converted into 16 bits in this modulation. In this case, connection bits are provided such that the numbers of binarized "1's" and "0's" are equal on an average. This is referred to as constraint of DC component and the slice level fluctuation of the reading signal which has been DC cut is restricted.

The demodulated data are subject to deinterleave processing and error correction processing. Thereafter, these data are input into the DVD-ROM decoder 24 and are subject to another error correction processing to improve data reliability. The data finished with these two-time error correction processing are temporarily stored in the buffer RAM 22 by the buffer manager 23. When these data are accumulated and form sector data, these sector data are transferred at one time to a host computer (not shown) by way of the ATAPI/SCSI interface 25. In the case of audio data, data output from the DVD decoder 17 are input into the D/A converter 26 and are retrieved as the analogue audio output signal Audio.

Data transferred from the host computer by way of the ATAPI/SCSI interface 25 are temporarily stored in the buffer RAM 22 by the buffer manager 23 when writing data. Thereafter, before writing data action starts, the laser beam spot is necessary to be positioned at the writing start point. This writing start point can be determined for a DVD+RW and a DVD+R by the wobbling signals which have been carved in the track of the optical disc 11 in a meandering manner.

The writing start point mentioned above for a DVD-RW and a DVD-R is determined by land prepits and, for a DVD-RAM and a DVD-RAM WO, by prepits.

The wobbling signals for a DVD+RW and a DVD+R contain address information referred to as ADdress In Pre-groove (ADIP). This information is retrieved by the ADIP decoder 18. The synchronization signals generated by the ADIP decoder 18 are input into the DVD encoder 20. Therefore, data can be accurately written in a determined position in the optical disc 11. As to the data stored in the buffer RAM 22, subsequent to addition of error correction codes and interleave performed at the DVD-ROM encoder 21 and the DVD encoder 20, the data are recorded in the optical disc 11 using the recording waveform of the present invention by way of the laser controller 19 and the optical pickup 13.

The recording and reading device of the present invention has the function of recording information in a write-once DVD medium including a substrate having a guide groove thereon in the following manner: recording a mark having the shortest length with a single light pulse having a power level of W0 or having a power level of W0 for the front end portion thereof with a power level of W1 for the rest portion thereof and the power level of W0 is higher than that of W1; recording the second shortest mark with a single light pulse having a power level of W1 or having a power level of W0 for the front end portion thereof with a power level of W1 for the rest portion thereof, or a single light pulse having a power level of W1 for the front end portion and the rear end portion thereof with a power level of W2 for the rest portion thereof and the power level of W1 is higher than that of W2; recording the mark having the third shortest length or longer with a single light pulse having a power level of W1 for the rear end portion thereof or the rear end portion thereof and the front end portion thereof with a power level of W2 for the rest portion thereof. Each single light pulse has a cooling area other than the recording area. The power in the cooling area is sustained not greater than 0.1 mW for a predetermined time length. By using the function, the recording and reading device can perform recording information in the medium with good quality at a high linear velocity.

The recording and reading device of the present invention also has the function of determining the length of a cooling area in the range of from 1/6 to 6/6 of the shortest space length. Therefore the device can select a suitable length for the cooling area, resulting in improvement on the quality of recording.

Further, the recording and reading device of the present invention can set the width of the front end portion of a heating light pulse for forming a mark depending on whether the mark has the shortest length when the space prior to the mark has the shortest length. In this case, the width of the front end portion of a heating light pulse for a mark having the shortest length is set to be longer than the width of the front end portion of a heating light pulse for a mark having a length longer than the shortest length. Further, the width of the front end portion of a heating light pulse for forming a mark can be set depending on whether the space prior to the mark has the shortest length when the mark has the shortest length. In this case, the width of the front end portion of a heating light pulse for a mark having the shortest length is set to be shorter than the width of the front end portion of a heating light pulse for forming a mark having a length longer than the shortest length. Therefore, this device can perform recording with good quality, i.e., low jitters. In addition, address information can be obtained by land prepits or prepits.

Figure 22:
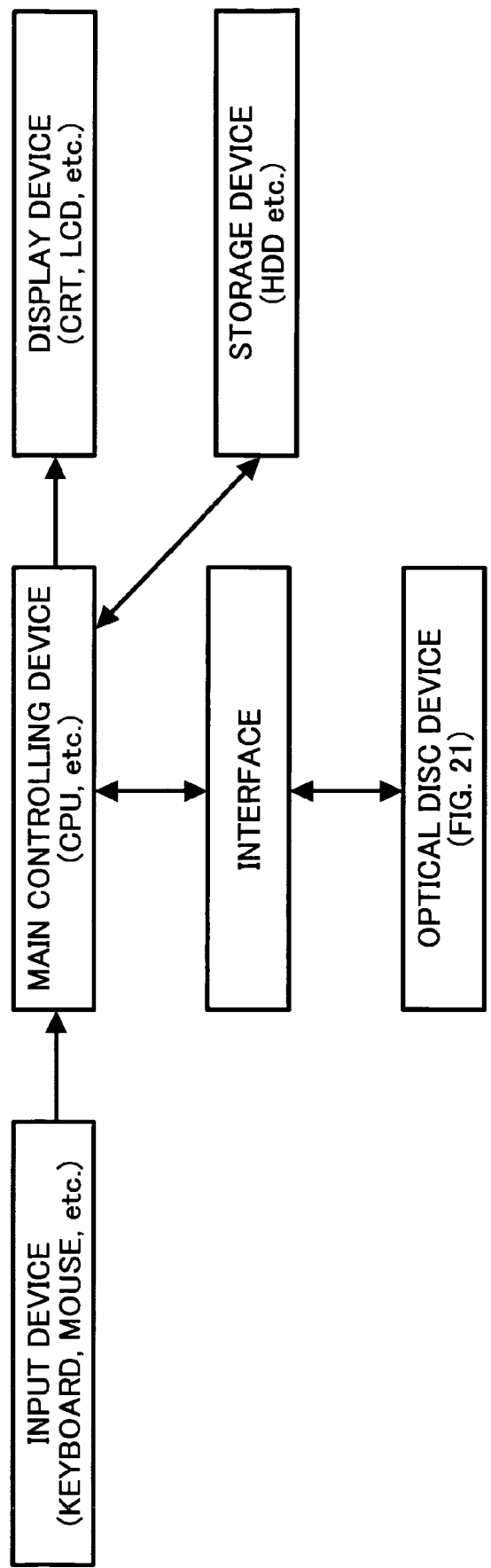
FIG. 22 is a schematic processing device using the optical disc drive illustrated in FIG. 21.

FIG. 22 is a schematic diagram illustrating an information processing device using the optical disc illustrated in FIG. 21.

The information processing device contains a main controlling device, an interface, a storage device, an input device and a display device. The main controlling device contains a central processing unit (CPU, microcomputer) (not shown), a main memory (not shown), etc. and controls the entire host computer. The interface is a dual way communication interface with the optical disc drive and conforms to the standard interface such as ATAPI and SCSI. The interface is connected to the interface 25 of the optical disc drive mentioned above. Each interface can be connected with not only a cable using communication lines such as communication cables (e.g., SCSI cable) but also with a wireless connection using, for example, infrared.

The storage device (hard disk drive (HDD)) contains a program written with a code which can be read by the microcomputer in the main controlling device. When the driving power source in the information processing device is switched on, the program mentioned above is loaded onto the main memory of the main controlling device. The display device includes a display unit (not shown) such as a cathode ray tube (CRT), a liquid crystal display (LCD) and a plasma display panel (PDP) and displays information from the main controlling device. The input device includes at least one input medium (not shown) such as a keyboard, a mouse and a pointing device and notifies the main controlling device of information input by a user. The information from an input medium can be input by a wireless system. As a device containing a display device and an input device in one body, there is, for example, a cathode ray tube having a touch panel. The information processing device contains an operating system (OS). All the devices constituting the information processing device is controlled by the OS.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present invention is now described in detail using nonlimiting examples and nonlimiting comparative examples.

Examples 1 to 8 and Comparative Examples 1 to 6

An optical recording medium was prepared as follows:

Weigh the following dye compounds represented by the following chemical formulae 1 and 2 with the weight ratio of 70 to 30;

Dissolve the weighed dye compounds in 2,2,3,3-tetrafluoro-1-propanol;

Apply the solution to a projection-molded polycarbonate substrate having a groove having a depth of 175 nm, a half value width of 0.30 μm, a track pitch of 0.74 μm, a thickness of 0.6 mm, a wobbling frequency corresponding to 32 T and an outer diameter of 120 mm by spinner coating to form an organic dye layer having a thickness of 90 nm;

Subsequent to drying for 30 minutes at 85° C., form an Ag reflective layer on the organic dye layer having a thickness of 110 nm by a sputtering method;

Form a protective layer made of an acrylic photopolymer having a thickness of 5 μm on the Ag reflective layer;

Attach a projection-molded polycarbonate flat substrate having a thickness of 0.6 mm and an outer diameter of 120 mm to the protective layer with an acrylic photopolymer.

Chemical formula 1:

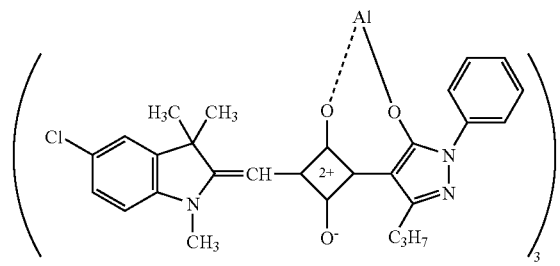

Chemical formula 2:

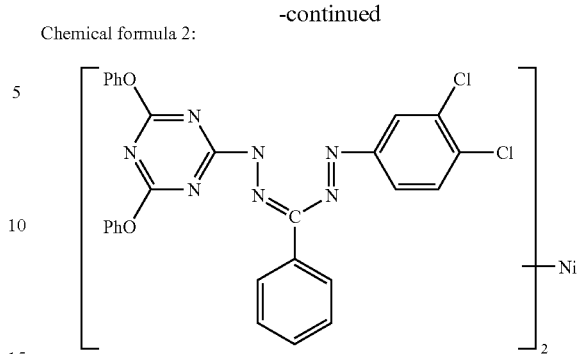

<Recording and Reading Condition>

By irradiating the optical recording medium prepared as mentioned above with a semiconductor laser beam having an oscillation wave length of 660 nm and a beam diameter of 0.9 μm, EFM signals having a minimum pit length of about 0.4 μm were recorded while tracking in the optical recording medium with a recording power such that the bottom jitter obtained was minimum under the recording conditions and recording velocity shown in Table 3. The jitter values, asymmetry and the number of PI errors were obtained by playing back the recorded portions. The waveforms of the laser beam used for recording are as shown in FIGS. 4 to 7. The pulse power W0 was an elevated pulse power for every mark, and the pulse power W1 was a not-elevated pulse power for every mark. The pulse lengths used at linear velocities of 56 m/s and 42 m/s were the pulse lengths shown in FIGS. 4 to 7, but the present invention does not limit thereto.

In Comparative Example 1, the quantity of light for the cooling area was 0.7 mW, which was equal to the reading light power. Namely, no cooling area was present in the recording pulse in Comparative Example 1. In Comparative Example 2, the quantity of light for the cooling area was 0.4 mW, which was larger than that of the present invention. In Comparative Example 3, no cooling area was present in the recording pulse as in Comparative Example 1 and the recording linear velocity was 42 m/s.

TABLE 3

| | Recording Speed (m/s) | Pulse cooling power at its rear end (mW) | Cooling pulse length (T) | W0/W1 | Bottom jitter | Asymmetry | PI error | Correction described in Table 1 (Y for Yes, N for No) |
|---|---|---|---|---|---|---|---|---|
| Example 1 | 56 (FIG. 4) | 0 | 1 | 1.65 | 7.80 | −0.01 | 6 | Y |
| Example 2 | 56 (FIG. 4) | 0 | 1.5 | 1.70 | 8.7 | 0.00 | 20 | N |
| Example 3 | 56 (FIG. 5) | 0.1 | 0.8 | 1.62 | 7.6 | −0.01 | 5 | Y |
| Example 4 | 56 (FIG. 5) | 0 | 1.5 | 1.65 | 7.8 | 0.00 | 7 | Y |
| Example 5 | 56 (FIG. 6) | 0 | 2.0 | 1.61 | 7.9 | −0.02 | 8 | Y |
| Example 6 | 42 (FIG. 7) | 0.1 | 2.5 | 1.58 | 8.1 | 0.01 | 3 | Y |
| Example 7 | 42 (FIG. 7) | 0 | 2.0 | 1.64 | 7.7 | 0.00 | 8 | Y |
| Comparative Example 1 | 56 (FIG. 4) | 0.7 | 0 | 1.65 | 8.3 | −0.07 | 30 | Y |
| Comparative Example 2 | 56 (FIG. 4) | 0.4 | 1.5 | 1.65 | 8.6 | −0.05 | 42 | Y |
| Comparative Example 3 | 42 (FIG. 7) | 0.7 | 0 | 1.60 | 8.4 | −0.07 | 38 | Y |

As seen in Table 3, generally Examples 1 to 7 are relatively good compared with Comparative Examples 1 to 3 with regard to jitter and asymmetry. The effectiveness of the present invention is fully shown. The bottom jitter of Example 2 was relatively high compared with those of Comparative Examples 1 to 3 because the correction described in Table 1 was made in Example 2.

In addition, by irradiating the optical recording medium prepared as described above with a semiconductor laser beam having an oscillation wave length of 660 nm and a beam diameter of 0.9 µm, EFM signals having a minimum pit length of about 0.4 µm were recorded while tracking in the optical recording medium with a recording power by which the minimum bottom jitter was obtained with the Table 1 correction and under the recording conditions and recording velocity shown in Table 4. The jitter values, asymmetry and the number of PI errors were obtained by playing back the recorded portions.

For Comparative Examples 4 to 6, an optical recording medium was prepared in the same manner as in Examples except that a prototype stamper made under the conditions that an LPP format for DVD-R is used and the amplitude of LPPb is changed and a molded substrate were used. Then the medium was evaluated in the same manner as in Examples.

<Recording and Reading Condition>

By irradiating the optical recording medium prepared as mentioned above with a semiconductor laser beam having an oscillation wave length of 660 nm and a beam diameter of 0.9 µm, EFM signals having a minimum pit length of about 0.4 µm were recorded while tracking in the optical recording medium with a recording power such that the bottom jitter obtained was minimum under the recording conditions and recording velocity shown in Table 5. The jitter values, asymmetry and the number of PI errors were obtained by playing back the recorded portions. The waveforms of the laser beam used for recording are as shown in FIGS. 8 to 11. The pulse power Wo was an elevated pulse power for the front end portion or the entire portion of a mark having the shortest length. The pulse power W1 was a not-elevated pulse power for a mark having the shortest length and an elevated pulse power for the front end portion of a mark having the second shortest length and the front end portion and the rear end portion of a mark having the third shortest length or longer. The pulse power W2 was a not-elevated power for a mark having the second shortest length and a mark having the third shortest length or longer. The pulse lengths used at linear velocities of 56 m/s and 42 m/s were the pulse lengths shown in FIGS. 8 to 11, but the present invention does not limit thereto.

In Comparative Example 7, the quantity of light for the cooling area was 0.7 mW, which was equal to the reading light power. Namely, no cooling area was present in the recording light pulse in Comparative Example 7. In Comparative Example 8, the quantity of light for the cooling area was 0.4 mW, which was larger than that of the present invention. In Comparative Example 9, no cooling area was present in the recording light pulse as in Comparative Example 7 and the recording linear velocity was 42 m/s.

TABLE 4

|  | Recording linear velocity (m/s) | Power in cooling area (mW) | Length of cooling area (T) | W0/W1 | Bottom jitter | Asymmetry | PI error | LPPb value |
|---|---|---|---|---|---|---|---|---|
| Example 8 | 42 (FIG. 7) | 0 | 1.5 | 1.60 | 7.9 | 0.00 | 8 | None |
| Comparative Example 4 | 42 (FIG. 7) | 0 | 1.5 | 1.60 | 7.8 | −0.01 | 13 | 0.10 |
| Comparative Example 5 | 42 (FIG. 7) | 0 | 1.5 | 1.60 | 8.3 | −0.01 | 55 | 0.24 |
| Comparative Example 6 | 42 (FIG. 7) | 0 | 1.5 | 1.60 | 8.4 | −0.01 | 492 | 0.37 |

As seen in Table 4, in samples using the LPP format, as LPPb increases PI errors increase while jitter is good. When LPPb is less than 0.16, as in Comparative Example 4, it has been confirmed that addresses detection by a device in the market is impossible.

Examples 9 to 16 and Comparative Examples 7 to 12

The same optical medium prepared above for Examples 1 to 7 was prepared and used.

TABLE 5

|  | Recording Speed (m/s) | Power in cooling area (mW) | Cooling area length (T) | W1/W2 | W0/W1 | Bottom jitter | Asymmetry | PI error | Correction described in Table 1 (Y for Yes, N for No) |
|---|---|---|---|---|---|---|---|---|---|
| Example 9 | 56 (FIG. 8) | 0 | 1 | 1.75 | 1.10 | 7.9 | −0.01 | 7 | Y |
| Example 10 | 56 (FIG. 8) | 0 | 1.5 | 1.80 | 1.15 | 8.7 | 0.00 | 15 | N |
| Example 11 | 56 (FIG. 9) | 0.1 | 0.8 | 1.75 | 1.08 | 7.7 | −0.02 | 8 | Y |

TABLE 5-continued

| | Recording Speed (m/s) | Power in cooling area (mW) | Cooling area length (T) | W1/W2 | W0/W1 | Bottom jitter | Asymmetry | PI error | Correction described in Table 1 (Y for Yes, N for No) |
|---|---|---|---|---|---|---|---|---|---|
| Example 12 | 56 (FIG. 9) | 0 | 1.5 | 1.72 | 1.05 | 7.5 | 0.00 | 3 | Y |
| Example 13 | 56 (FIG. 10) | 0 | 2.0 | 1.75 | 1.11 | 8.0 | −0.01 | 5 | Y |
| Example 14 | 42 (FIG. 11) | 0.1 | 2.5 | 1.70 | 1.05 | 7.4 | 0.00 | 2 | Y |
| Example 15 | 42 (FIG. 11) | 0 | 2.0 | 1.68 | 1.10 | 7.7 | −0.01 | 9 | Y |
| Comparative Example 7 | 56 (FIG. 8) | 0.7 | 0 | 1.75 | 1.10 | 8.2 | −0.08 | 28 | Y |
| Comparative Example 8 | 56 (FIG. 8) | 0.4 | 1.5 | 1.75 | 1.10 | 8.5 | −0.05 | 32 | Y |
| Comparative Example 9 | 42 (FIG. 11) | 0.7 | 0 | 1.65 | 1.05 | 8.4 | −0.07 | 35 | Y |

As seen in Table 5, generally Examples 9 to 15 are relatively good compared with Comparative Examples 7 to 9 with regard to jitter and asymmetry. The effectiveness of the present invention is fully shown. The bottom jitter of Example 10 was relatively high compared with those of Comparative Examples 7 to 9 because correction described in Table 1 was made in Example 10.

In addition, by irradiating the optical recording medium prepared as mentioned above with a semiconductor laser beam having an oscillation wave length of 660 nm and a beam diameter of 0.9 µm, EFM signals having a minimum pit length of about 0.4 µm were recorded while tracking in the optical recording medium with a recording power such that the bottom jitter obtained was minimum under the recording conditions and recording velocity shown in Table 6. The jitter values, asymmetry and the number of PI errors were obtained by playing back the recorded portions.

For Comparative Examples 10 to 12, an optical recording medium was prepared in the same manner as in Examples except that a prototype stamper made under the conditions that an LPP format for DVD-R is used and the amplitude of LPPb is changed and a molded substrate were used. Then the medium was evaluated in the same manner as in Examples.

As seen in Table 6, in samples using the LPP format, as LPPb increases, PI errors increase while jitter is good. When the LPPb is less than 0.16, as in Comparative Example 10, it has been confirmed that addresses detection by a device in the market is impossible.

Examples 17 to 27, Comparative Examples 13 to 19

An optical recording medium was prepared as follows:
Weigh the following dye compounds represented by the following formulae 1 and 2 with the weight ratio of 70 to 30;
Dissolve the weighed dye compounds in 2,2,3,3-tetrafluoro-1-propanol;
Apply the solution to a projection-molded polycarbonate substrate having a groove having depth of 166 nm, a half value width of 0.38 µm, a track pitch of 0.74 µm, a thickness of 0.6 mm corresponding to the wobbling frequency of 32 T and an outer diameter of 120 mm by spinner coating to form an organic dye layer having a thickness of 75 nm;
Subsequent to drying for 30 minutes at 90° C., form an Ag reflective layer on the organic dye layer having a thickness of 110 nm by a sputtering method;
Form a protective layer on the Ag reflective layer made of an acrylic photopolymer having a thickness of 5 µm;
Attach a projection-molded polycarbonate flat substrate having a thickness of 0.6 mm and an outer diameter of 120 mm to the protective layer with an acrylic photopolymer.

TABLE 6

| | Recording linear velocity (m/s) | Power in cooling area (mW) | Length of cooling area (T) | W1/W2 | W0/W1 | Bottom jitter | Asymmetry | PI error | LPPb value |
|---|---|---|---|---|---|---|---|---|---|
| Example 16 | 42 (FIG. 11) | 0 | 1.5 | 1.65 | 1.05 | 8.0 | −0.01 | 8 | None |
| Comparative Example 10 | 42 (FIG. 11) | 0 | 1.5 | 1.65 | 1.05 | 7.9 | −0.01 | 12 | 0.10 |
| Comparative Example 11 | 42 (FIG. 11) | 0 | 1.5 | 1.65 | 1.05 | 8.1 | −0.01 | 50 | 0.24 |
| Comparative Example 12 | 42 (FIG. 11) | 0 | 1.5 | 1.65 | 1.05 | 8.2 | −0.01 | 478 | 0.37 |

Chemical formula 1:

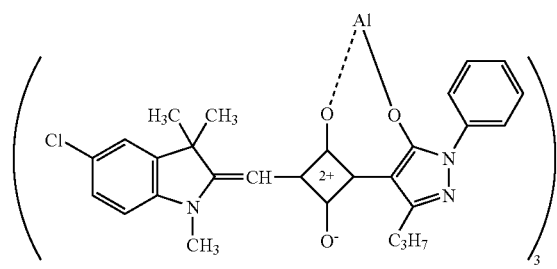

Chemical formula 2:

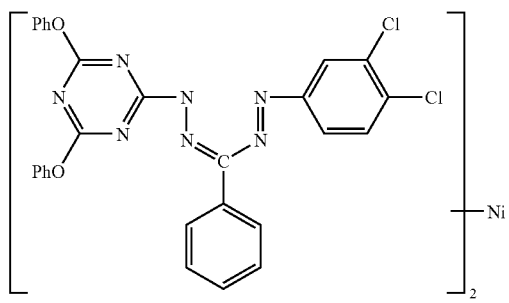

<Recording and Reading Condition>

By irradiating the optical recording medium prepared as described above with a semiconductor laser beam having an oscillation wave length of 660 nm and a beam diameter of 0.9 μm, EFM signals having a minimum pit length of about 0.4 μm were recorded while tracking in the optical recording medium with a recording power such that the bottom jitter obtained was minimum under the recording conditions and recording velocity shown in Table 7. The jitter values, asymmetry and the number of PI errors were obtained by playing back the recorded portions. The waveforms of the laser beam used for recording are as shown in FIGS. 12 to 20. The pulse power W0 was an elevated pulse power for the front end portion or the entire portion of a mark having the shortest length and the front end portion of a mark having the second shortest length. The pulse power W1 was a not-elevated pulse power for a mark having the shortest length, a not-elevated pulse power for a mark having the second shortest length when the pulse power is elevated for only the front end portion thereof, an elevated pulse power for the front end portion and the rear end portion of a mark having the second shortest length when the pulse power is raised for the front end portion and the rear end portion thereof (i.e., the elevated power for the front end portion and rear end portion when the power W2 is a base power), and an elevated pulse power for a mark having the third shortest length or longer. The pulse power W2 was a not-elevated power for a mark having the third shortest length or longer. The pulse lengths used at linear velocities of 56 m/s and 42 m/s were the pulse lengths shown in FIGS. 12 to 20, but the present invention does not limit thereto.

In Comparative Example 13, the quantity of light for the cooling area was 0.7 mW, which was equal to the reading light power. Namely, the recording pulse in Comparative Example 13 has no cooling area. In comparative Example 14, the quantity of light for the cooling area was 0.3 mW, which was larger than that of the present invention. In Comparative Example 15, recording was performed at a high recording linear velocity without a cooling area as in Comparative Example 13. In Example 26, the length of the cooling area was 0.4 T, which was shorter than the shortest cooling area length of the present invention, i.e., 1/6 of the shortest length of 3 T, namely 0.5 T.

TABLE 7

| | Recording Speed (m/s) | Power in cooling area (mW) | Cooling area length (T) | W1/W2 | W0/W1 | Bottom Jitter | Asymmetry | PI error | Correction described in Table 1 (Y for Yes, N for No) |
|---|---|---|---|---|---|---|---|---|---|
| Example 17 | 56 (FIG. 12) | 0 | 1 | 1.65 | 1.05 | 8.0 | −0.01 | 8 | Y |
| Example 18 | 56 (FIG. 12) | 0 | 1.5 | 1.70 | 1.22 | 9.2 | 0.00 | 20 | N |
| Example 19 | 56 (FIG. 13) | 0.1 | 0.8 | 1.62 | 1.18 | 7.8 | −0.02 | 10 | Y |
| Example 20 | 42 (FIG. 14) | 0 | 2.0 | 1.58 | 1.08 | 7.7 | 0.00 | 8 | Y |
| Example 21 | 42 (FIG. 15) | 0.1 | 2.0 | 1.60 | 1.08 | 7.6 | 0.00 | 5 | Y |
| Example 22 | 42 (FIG. 16) | 0 | 2.5 | 1.60 | 1.16 | 7.8 | 0.00 | 9 | Y |
| Example 23 | 42 (FIG. 17) | 0 | 2.0 | 1.54 | 1.14 | 7.9 | −0.01 | 8 | Y |
| Example 24 | 56 (FIG. 17) | 0.1 | 2.5 | 1.63 | 1.06 | 7.7 | 0.00 | 3 | Y |
| Example 25 | 56 (FIG. 19) | 0 | 2.0 | 1.64 | 1.10 | 7.8 | −0.01 | 5 | Y |
| Example 26 | 56 (FIG. 18) | 0 | 0.4 | 1.65 | 1.05 | 8.3 | −0.05 | 18 | Y |
| Comparative Example 13 | 56 (FIG. 12) | 0.7 | 0 | 1.65 | 1.05 | 7.9 | −0.10 | 51 | Y |
| Comparative Example 14 | 56 (FIG. 12) | 0.3 | 0.5 | 1.65 | 1.05 | 8.2 | −0.05 | 38 | Y |
| Comparative Example 15 | 42 (FIG. 14) | 0.7 | 0 | 1.58 | 1.08 | 8.3 | −0.08 | 63 | Y |
| Comparative Example 16 | 56 (FIG. 20) | 0 | 1 | 1.58 | 1.05 | 7.9 | −0.06 | 12 | Y |

As seen in Table 7, generally Examples 17 to 26 are relatively good compared with Comparative Examples 13 to 16 with regard to jitter and asymmetry and extremely good with regard to PI error. As in Comparative Example 16, when the pulse has a power level higher at its front end portion than the rest thereof for the mark having at least third shortest length, the jitter obtained was generally low but the asymmetry was not good. However, when the recording linear velocity is not higher than about 21 m/s, it has been confirmed that good jitter results and good asymmetry are secured.

In addition, by irradiating the optical recording medium prepared as described above with a semiconductor laser beam having an oscillation wave length of 660 nm and a beam diameter of 0.9 µm, EFM signals having a minimum pit length of about 0.4 µm were recorded while tracking in the optical recording medium with a recording power such that the bottom jitter obtained was minimum under the recording conditions and recording velocity shown in Table 8. The jitter values, asymmetry and the number of PI errors were obtained by playing back the recorded portions.

For Comparative Examples 17 to 19, an optical recording medium was prepared in the same manner as in Examples 17 to 27 except that a prototype stamper made under the conditions that an LPP format for DVD-R is used and the amplitude of LPPb is changed and a molded substrate were used. Then the medium was evaluated in the same manner as in Examples.

TABLE 8

|  | Recording linear velocity (m/s) | Power in cooling area (mW) | Length of cooling area (T) | W1/W2 | W0/W1 | Bottom jitter | Asymmetry | PI error | LPPb value |
|---|---|---|---|---|---|---|---|---|---|
| Example 27 | 42 (FIG. 15) | 0 | 1.5 | 1.58 | 1.06 | 8.0 | −0.01 | 9 | None |
| Comparative Example 17 | 42 (FIG. 15) | 0 | 1.5 | 1.58 | 1.06 | 7.9 | −0.01 | 11 | 0.10 |
| Comparative Example 18 | 42 (FIG. 15) | 0 | 1.5 | 1.58 | 1.06 | 9.0 | −0.01 | 42 | 0.24 |
| Comparative Example 19 | 42 (FIG. 15) | 0 | 1.5 | 1.58 | 1.06 | 8.0 | −0.01 | 631 | 0.37 |

As seen in Table 8, in samples using the LPP format, as LPPb increases, PI errors increase while jitter is good. When the LPPb is less than 0.16, as in Comparative Example 17, it has been confirmed that addresses detection by a device in the market is impossible.

This document claims priority and contains subject matter related to Japanese Patent Applications Nos. 2004-075962, 2004-023592, 2004-045873, 2004-045931, 2004-075935 and 2004-102062, filed on Mar. 17, 2004, Jan. 30, 2004, Feb. 23, 2004 and Feb. 23, 2004, Mar. 17, 2004 and Mar. 31, 2004, respectively, incorporated herein by reference.

Having now fully described the invention, it will be apparent to one of ordinary skill in the art that many changes and modifications can be made thereto without departing from the spirit and scope of the invention as set forth therein.

What is claimed as new and desired to be protected by Letters Patent of the United States is:

1. A recording method of recording information in a dye-based write-once digital versatile disc (DVD) comprising a substrate having a wobbled guide groove and a recording layer located overlying the substrate and comprising an organic dye, comprising:
irradiating the DVD with three kinds of single light pulses, each of which comprising a recording area to record a mark and a cooling area having a light quantity not greater than 0.1 mW for a predetermined time while a space is formed between the adjacent marks,
wherein, when the mark having a shortest length is formed, the irradiating comprises:
irradiating the DVD with a first single light pulse in which an entire of the recording area has a power level of W0 or a front end portion of the recording area has a power level of W0 and a rest portion of the pulse has a power level of W1;
when the mark having a second shortest length is formed, the irradiating comprises:
irradiating the DVD with a second single light pulse in which an entire of the recording area has a power level of W1; at least a front end portion of the recording area has a power level of W0 and a rest portion thereof has a power level of W1; or at least a front end portion of the recording area has a power level of W1 and a rest portion thereof has a power level of W2;
when the mark having a third shortest length or longer is formed, the irradiating comprises:
irradiating the DVD with a third single light pulse in which at least a rear end portion of the recording area has a power level of W0 and a rest portion thereof has a power level of W1; or at least a rear end portion of the recording area has a power level of W1 and a rest portion thereof has a power level of W2; and
wherein W0, W1 and W2 satisfy a relationship, W0>W1>W2, and the highest power level of the second single light pulse is not lower than the highest power level of the third light pulse.

2. The recording method according to claim 1, wherein the recording area of the second single light pulse has a power level of W0 for the front end portion thereof and a power level of W1 for the rest portion thereof, and the recording area of the third single light pulse has a power level of W0 for the front end portion and a rear end portion thereof, and a power level of W1 for a middle portion thereof.

3. The recording method according to claim 1, wherein the recording area of the second single light pulse has a power level of W0 for the second front end portion thereof and a power level of W1 for the rest portion thereof, and the recording area of the third single light pulse has a power level of W0 for the rear end portion thereof and a power level of W1 for the rest portion.

4. The recording method according to claim 1, wherein the recording area of the second single light pulse has a power level of W1 for the front end portion thereof and a power level of W2 for the rest portion thereof, and the recording area of the third single light pulse has a power level of W1 for the front end portion and a rear end portion thereof and a power level of W2 for a middle portion thereof.

5. The recording method according to claim 1, wherein the recording area of the second single light pulse has a power level of W1 for the front end portion thereof and a power level of W2 for the rest portion thereof, and the recording area of the third single light pulse has a power level of W1 for the rear end portion thereof and a power level of W2 for the rest portion thereof.

6. The recording method according to claim 1, wherein the recording area of the second single light pulse has a power level of W0 for the front end portion thereof and a power level of W1 for the rest portion thereof, and the recording area of the third single light pulse has a power level of W1 for the rear end portion and a front end portion thereof and a power level of W2 for a middle portion thereof.

7. The recording method according to claim 1, wherein the recording area of the second single light pulse has a power level of W0 for the front end portion thereof and a power level of W1 for the rest portion thereof, and the recording area of the third single light pulse has a power level of W1 for the rear end portion thereof and a power level of W2 for the rest portion thereof.

8. The recording method according to claim 1, wherein the recording area of the first single light pulse has a power level of W0 for the front end portion thereof and a power level of W1 for the rest portion thereof, the recording area of the second single light pulse has a power level of W1 for an entire portion thereof or for the front end portion and a rear end portion and a power level of W2 for a middle portion, and the recording area of the third single light pulse has a power level of W1 for the rear end portion and a front end portion thereof and a power level of W2 for a middle portion thereof.

9. The recording method according to claim 1, wherein the recording area of the first single light pulse has a power level of W0 for the front end portion thereof and a power level of W1 for the rest portion thereof, the recording area of the second single light pulse has a power level of W1 for an entire portion thereof or for the front end portion and a rear end portion thereof and a power level of W2 for a middle portion thereof, and the recording area of the third single light pulse has a power level of W1 for the rear end portion thereof and a power level of W2 for the rest portion thereof.

10. The recording method according to claim 1, wherein a length of a portion of the DVD which is irradiated with the cooling area of the single light pulse for the predetermined time is 1/6 to 6/6 of a length of a space having a shortest length.

11. The recording method according to claim 1, wherein, when the mark having a shortest length is recorded after a space having a shortest length, a width of the front end portion of the recording area of the single light pulse for the mark is set to be longer than that of the front end portion of the recording area of the single light pulse for the mark having a length longer than the shortest length, and to be shorter than a width of the front end portion of the recording area of the single light pulse for the mark whose prior space has a length longer than the shortest length.

12. A recording and reading method of recording information in a dye-based write-once digital versatile disc (DVD) comprising a substrate having a wobbled guide groove and a recording layer located overlying the substrate and comprising an organic dye, comprising:

first irradiating the DVD with three kinds of single light pulses, each of which comprising a recording area to record a mark and a cooling area having a light quantity not greater than 0.1 mW for a predetermined time while a space is formed between the adjacent marks; and second irradiating the mark with light to reproduce information recorded in the DVD, wherein, when the mark having a shortest length is formed, the first irradiating comprises:

irradiating the DVD with a first single light pulse in which an entire of the recording area has a power level of W0 or a front end portion of the recording area has a power level of W0 and a rest portion of the pulse has a power level of W1;

when the mark having a second shortest length is formed, the irradiating comprises:

irradiating the DVD with a second single light pulse in which an entire of the recording area has a power level of W1; at least a front end portion of the recording area has a power level of W0 and a rest portion thereof has a power level of W1; or at least a front end portion of the recording area has a power level of W1 and a rest portion thereof has a power level of W2;

when the mark having a third shortest length or longer is formed, the irradiating comprises:

irradiating the DVD with a third single light pulse in which at least a rear end portion of the recording area has a power level of W0 and a rest portion thereof has a power level of W1; or at least a rear end portion of the recording area has a power level of W1 and a rest portion thereof has a power level of W2;

wherein W0, W1 and W2 satisfy a relationship, W0>W1>W2, and wherein the highest power level of the second single light pulse is not lower than the highest power level of the third light pulse.

13. The recording and reading method according to claim 12, wherein the wobbled guide groove has a frequency of 4 T to 96 T, wherein T represents a basic clock frequency.

14. The recording and reading method according to claim 12, wherein a ratio (Wo/PP) of the amplitude (Wo) of the wobbled guide groove to a push-pull amplitude (PP) of tracking error detection signals for detecting and controlling tracking errors determined with a two separation optical power detector is synchronized in a range of from 0.1 to 0.4.

15. The recording and reading method according to claim 12, wherein the single light pulse has a wavelength of from 600 to 720 nm.

16. The recording and reading method according to claim 12, wherein the recording layer has a refraction index n of from 1.5 to 3.0 and an extinction index k of 0.02 to 0.2 for light having a wavelength in the range of from −5 nm to +5 nm to the wavelength of the recording light and reading light.

17. The recording and reading method according to claim 12, wherein a decomposition starting temperature of the recording layer is from 100 to 360° C.

18. The recording and reading method according to claim 12, wherein the dye-based write-once DVD medium further comprises at least one of a reflective layer, a protective layer, an adhesive layer, a protective substrate and a hard coating layer on the substrate.

19. The recording and reading method according to claim 18, wherein the dye-based write-once DVD medium includes a reflective layer and the reflective layer comprises one of a metal selected from the group consisting of Au, Ag, Al and alloys thereof.

20. The recording and reading method according to claim 18, wherein the write-once DVD medium includes a protective layer and the protective layer comprises an ultraviolet curing resin.

21. The recording and reading method according to claim 18, wherein the dye-based write-once DVD medium includes the adhesive layer comprising an adhesive agent comprising an ultraviolet curing resin and further comprises another substrate which is attached to the substrate with an adhesive layer therebetween to form a double sided recording medium.

22. A recording and reading device comprising:
a motor driver;
a spindle motor; and
an optical pickup configured to irradiate a dye-based write-once digital versatile disc (DVD) comprising a substrate having a wobbled guide groove and a recording layer located overlying the substrate and comprising an organic dye, with three kinds of single light pulses, each of which comprising a recording area to record a mark and a cooling area having a light quantity not greater than 0.1 mW for a predetermined time while a space is formed between the adjacent marks, and second irradiating the mark with light to reproduce information recorded in the DVD,
wherein, when the mark having a shortest length is formed, the first irradiating comprises:
irradiating the DVD with a first single light pulse in which an entire of the recording area has a power level of W0 or a front end portion of the recording area has a power level of W0 and a rest portion of the pulse has a power level of W1;
when the mark having a second shortest length is formed, the irradiating comprises:
irradiating the DVD with a second single light pulse in which an entire of the recording area has a power level of W1; at least a front end portion of the recording area has a power level of W0 and a rest portion thereof has a power level of W1; or at least a front end portion of the recording area has a power level of W1 and a rest portion thereof has a power level of W2;
when the mark having a third shortest length or longer is formed, the irradiating comprises:
irradiating the DVD with a third single light pulse in which at least a rear end portion of the recording area has a power level of W0 and a rest portion thereof has a power level of W1; or at least a rear end portion of the recording area has a power level of W1 and a rest portion thereof has a power level of W2;
wherein W0, W1 and W2 satisfy a relationship, W0>W1>W2, and wherein the highest power level of the second single light pulse is not lower than the highest power level of the third light pulse.

23. The recording and reading device according to claim 22, wherein the recording area of the second single light pulse has a power level of W0 for the front end portion thereof and a power level of W1 for the rest portion thereof, and the recording area of the third single light pulse has a power level of W0 for the front end portion and a rear end portion thereof, and a power level of W1 for a middle portion thereof.

24. The recording and reading device according to claim 22, wherein the recording area of the second single light pulse has a power level of W0 for the second front end portion thereof and a power level of W1 for the rest portion thereof, and the recording area of the third single light pulse has a power level of W0 for the rear end portion thereof and a power level of W1 for the rest portion.

25. The recording and reading device according to claim 22, wherein the recording area of the second single light pulse has a power level of W1 for the front end portion thereof and a power level of W2 for the rest portion thereof, and the recording area of the third single light pulse has a power level of W1 for the front end portion and a rear end portion thereof and a power level of W2 for a middle portion thereof.

26. The recording and reading device according to claim 22, wherein the recording area of the second single light pulse has a power level of W1 for the front end portion thereof and a power level of W2 for the rest portion thereof, and the recording area of the third single light pulse has a power level of W1 for the rear end portion thereof and a power level of W2 for the rest portion thereof.

27. The recording and reading device according to claim 22, wherein the recording area of the second single light pulse has a power level of W0 for the front end portion thereof and a power level of W1 for the rest portion thereof, and the recording area of the third single light pulse has a power level of W1 for the rear end portion and a front end portion thereof and a power level of W2 for a middle portion thereof.

28. The recording and reading device according to claim 22, wherein the recording area of the second single light pulse has a power level of W0 for the front end portion thereof and a power level of W1 for the rest portion thereof, and the recording area of the third single light pulse has a power level of W1 for the rear end portion thereof and a power level of W2 for the rest portion thereof.

29. The recording and reading device according to claim 22, the recording area of the first single light pulse has a power level of W0 for the front end portion thereof and a power level of W1 for the rest portion thereof, the recording area of the second single light pulse has a power level of W1 for an entire portion thereof or for the front end portion and a rear end portion and a power level of W2 for a middle portion, and the recording area of the third single light pulse has a power level of W1 for the rear end portion and a front end portion thereof and a power level of W2 for a middle portion thereof.

30. The recording and reading device according to claim 22, wherein the recording area of the first single light pulse has a power level of W0 for the front end portion thereof and a power level of W1 for the rest portion thereof, the recording area of the second single light pulse has a power level of W1 for an entire portion thereof or for the front end portion and a rear end portion thereof and a power level of W2 for a middle portion thereof, and the recording area of the third single light pulse has a power level of W1 for the rear end portion thereof and a power level of W2 for the rest portion thereof.

31. The recording and reading device according to claim 22, wherein a length of a portion of the DVD which is irradiated with the cooling area of the single light pulse for the predetermined time is 1/6 to 6/6 of a length of a space having a shortest length.

32. The recording and reading device according to claim 22, wherein, when the mark having a shortest length is recorded after a space having a shortest length, a width of the front end portion of the recording area of the single light pulse for the mark is set to be longer than that of the front end portion of the recording area of the single light pulse for the mark having a length longer than the shortest length, and to be shorter than a width of the front end portion of the recording area of the single light pulse for the mark whose prior space has a length longer than the shortest length.

* * * * *